(12) United States Patent
Xiong et al.

(10) Patent No.: US 11,171,746 B2
(45) Date of Patent: Nov. 9, 2021

(54) CHANNEL STATE AND BEAM RELATED INFORMATION REPORTING

(71) Applicant: Apple Inc., Cupertino, CA (US)

(72) Inventors: Gang Xiong, Beaverton, OR (US); Hong He, Beijing (CN); Yushu Zhang, Beijing (CN); Wenting Chang, Beijing (CN); Yuan Zhu, Beijing (CN)

(73) Assignee: Apple Inc., Cupertino, CA (US)

( * ) Notice: Subject to any disclaimer, the term of this patent is extended or adjusted under 35 U.S.C. 154(b) by 155 days.

(21) Appl. No.: 16/309,856

(22) PCT Filed: Jun. 15, 2017

(86) PCT No.: PCT/US2017/037637
§ 371 (c)(1),
(2) Date: Dec. 13, 2018

(87) PCT Pub. No.: WO2017/218749
PCT Pub. Date: Dec. 21, 2017

(65) Prior Publication Data
US 2019/0173622 A1 Jun. 6, 2019

Related U.S. Application Data

(60) Provisional application No. 62/350,545, filed on Jun. 15, 2016.

(51) Int. Cl.
| | |
|---|---|
| *H04L 1/18* | (2006.01) |
| *H04L 1/16* | (2006.01) |
| *H04L 5/00* | (2006.01) |
| *H04L 1/00* | (2006.01) |
| *H04W 76/27* | (2018.01) |
| *H04W 72/04* | (2009.01) |
| *H04W 80/02* | (2009.01) |

(52) U.S. Cl.
CPC ............. *H04L 1/1819* (2013.01); *H04L 1/00* (2013.01); *H04L 1/1671* (2013.01);
(Continued)

(58) Field of Classification Search
CPC ............... H04W 72/04; H04W 72/042; H04W 72/0446; H04W 72/0413; H04W 72/046;
(Continued)

(56) References Cited

U.S. PATENT DOCUMENTS

2010/0195575 A1* 8/2010 Papasakellariou .... H04L 5/0057
370/328
2011/0243066 A1* 10/2011 Nayeb Nazar ........ H04L 1/0057
370/328
(Continued)

OTHER PUBLICATIONS

"International Application Serial No. PCT/US2017/037637, International Search Report dated Sep. 22, 2017", 4 pgs.
(Continued)

*Primary Examiner* — Jeffrey M Rutkowski
*Assistant Examiner* — Sudesh M Patidar
(74) *Attorney, Agent, or Firm* — Kowert, Hood, Munyon, Rankin & Goetzel, P.C.

(57) ABSTRACT

Apparatus that sends uplink control information (UCI) from user equipment (UE) to a network node, generates elements of the UCI including at least one of hybrid automatic repeat request-acknowledgement (HARQ-ACK) feedback for one or more uplink (UL) resources, a scheduling request (SR), a channel state information (CSI) report and a beam related information report in response to a trigger set by the network node. The apparatus encodes the UCI elements for transmission via a physical uplink control channel (PUCCH) or a physical uplink shared channel (PUSCH) of the one or more UL resources. The one or more UL resources may be UL slots or UL portions of downlink-uplink (DL-UL) slots received from a network node.

23 Claims, 13 Drawing Sheets

(52) U.S. Cl.
CPC .......... *H04L 1/1861* (2013.01); *H04L 1/1864* (2013.01); *H04L 5/0055* (2013.01); *H04L 5/0057* (2013.01); *H04W 72/046* (2013.01); *H04W 72/0413* (2013.01); *H04W 76/27* (2018.02); *H04W 80/02* (2013.01)

(58) Field of Classification Search
CPC ..... H04W 88/02; H04W 76/27; H04W 80/02; H04W 74/002; H04W 74/004; H04W 24/10; H04L 1/1819; H04L 1/1864; H04L 1/1671; H04L 1/1861; H04L 5/0048; H04L 5/0023; H04L 5/0053; H04L 5/0007; H04L 5/0057; H04L 5/0055; H04L 1/00; H04B 17/327; H04B 7/0617
See application file for complete search history.

(56) References Cited

U.S. PATENT DOCUMENTS

| | | | | |
|---|---|---|---|---|
| 2013/0083751 | A1* | 4/2013 | Papasakellariou | .................... H04W 72/0406 370/329 |
| 2013/0117622 | A1* | 5/2013 | Blankenship | ........... H04L 1/007 714/751 |
| 2013/0258874 | A1* | 10/2013 | Khoshnevis | .......... H04L 1/0031 370/252 |
| 2013/0308503 | A1* | 11/2013 | Kim | ...................... H04L 5/0053 370/280 |
| 2015/0365925 | A1 | 12/2015 | Fu et al. | |
| 2016/0218832 | A1* | 7/2016 | Dabeer | ................. H04L 1/1671 |
| 2016/0295573 | A1* | 10/2016 | Lee | ........................ H04L 1/1812 |
| 2017/0070277 | A1* | 3/2017 | Si | ......................... H04B 7/0456 |
| 2017/0264401 | A1* | 9/2017 | Soong | ..................... H04L 5/005 |
| 2018/0034526 | A1* | 2/2018 | Lee | ....................... H04W 24/10 |
| 2018/0069675 | A1* | 3/2018 | Chang | .................. H04L 5/0053 |
| 2018/0270011 | A1* | 9/2018 | Yang | ....................... H04L 27/26 |
| 2019/0260450 | A1* | 8/2019 | Kim | ................. H04W 72/1289 |

OTHER PUBLICATIONS

"International Application Serial No. PCT/US2017/037637, Written Opinion dated Sep. 22, 2017", 14 pgs.
Catt, "CSI feedback for beatnformed CSI-RS on PUSCH", R1-153946 3GPP TSG RAN WG1 Meeting #82 Beijing China, (Aug. 15, 2015).
NTT Docomo Inc, "Discussion on frame structure for NR", R1-165176 3GPP TSG RAN WG1 Meeting 85 Nanjing P. R. China, (May 14, 2016).

* cited by examiner

CHANNEL STATE AND BEAM RELATED INFORMATION REPORTING

CROSS REFERENCE TO RELATED APPLICATIONS

This application is a U.S. National Stage Filing under 35 U.S.C. 371 from International Application No. PCT/US201.7/037637filed Jun. 15, 2017 and published in English as WO 2017/218749 on Dec. 21, 2017, which claims the benefit of priority to U.S. Provisional Patent Application Ser. No. 62/350,545, filed Jun. 15, 2016, and entitled "CSI AND BEAM RELATED INFORMATION REPORTING' each of which is incorporated herein by reference in its entirety

TECHNICAL FIELD

This application relates to radio access networks and, in particular, to apparatus for reporting uplink control information (UCI), including channel state information (CSI), beam related information and/or hybrid automatic repeat request (HARQ) acknowledgement (ACK) and negative acknowledgement (NACK) information.

BACKGROUND

Wireless communication systems send and receive data at increasing rates using a variety of transmission modes, encoding techniques and modulation schemes. These communication systems employ multiple antennas and modulation schemes such as quadrature amplitude modulation (QAM) as well as transmission techniques such as carrier aggregation (CA) and orthogonal frequency division multiple access (OFDMA). The systems support downlink data rates and upload data rates greater than one gigabit per second (1 Gbit/s). The communication systems may be used to send a small number of high-data rate communications or a larger number of lower data rate communications. The peak rates assume channels having minimal noise and interference. Wireless channels, however, are subject to noise, multipath fading, inter-symbol interference, Doppler shifts due to mobile user equipment (UE) and other noise or distortion sources.

The communications standards include a number of techniques for avoiding or overcoming noise and distortion in a channel. These include obtaining UCI to identify bad or deteriorating channels, encoding the data with a forward error correction (FEC), and employing a hybrid automatic repeat request (HARQ) scheme to resend corrupted data.

The status of the channel or channels used to transmit data may change rapidly, especially for mobile UEs. It is desirable for a radio access network (RAN) device, such as an evolved Node B (eNB) or next generation Node B (gNB) to be able determine channel status with reduced latency for a number of channels in order to determine which channels to use and what transmission modes, encoding techniques and modulation schemes to use on each of the channels so that the data transmitted in each channel likely to be received.

DESCRIPTION OF EMBODIMENTS

Figure 1:
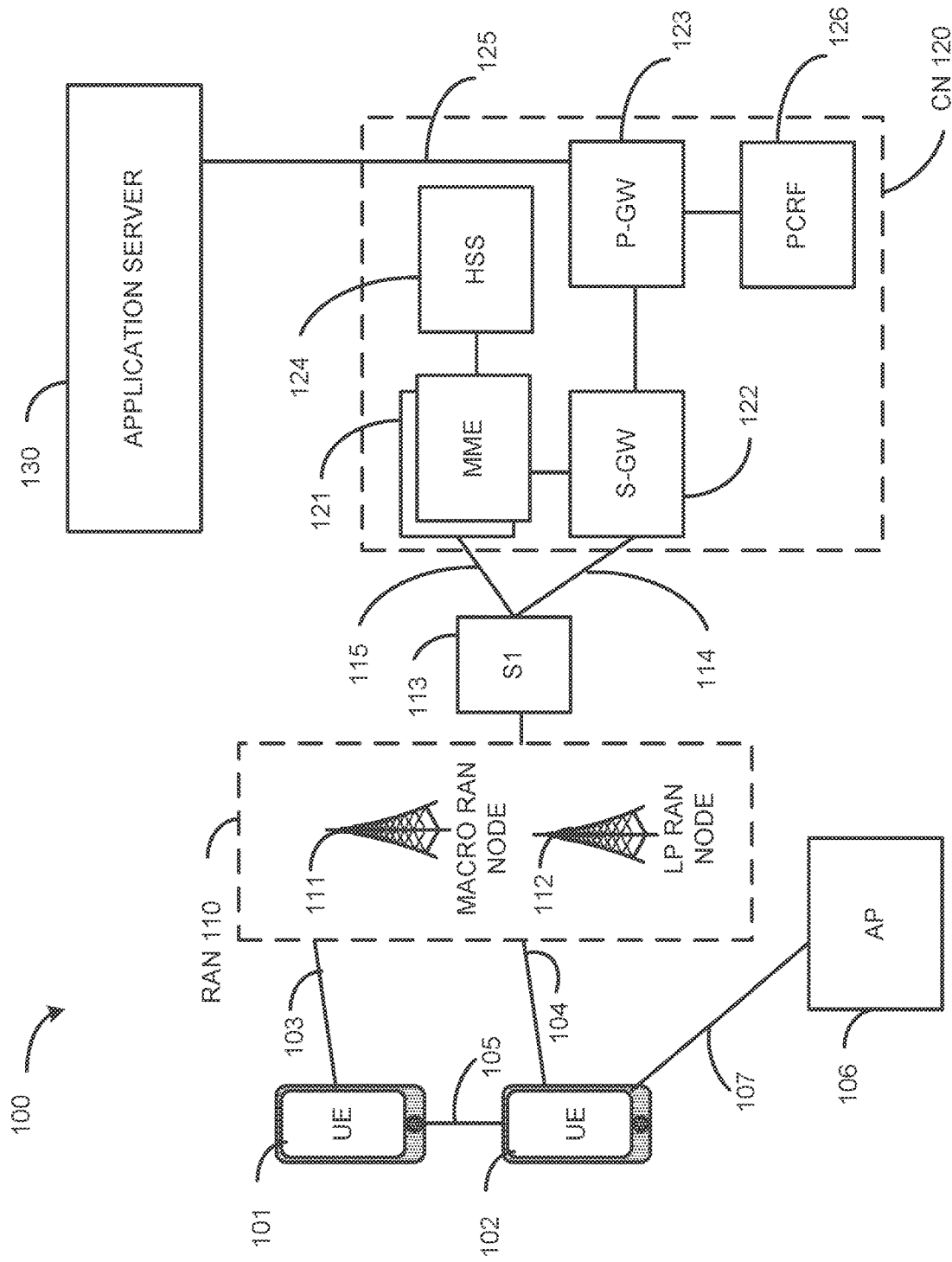
FIG. 1 illustrates an architecture of a network in accordance with some embodiments.

The following detailed description refers to the accompanying drawings. The same reference numbers may be used in different drawings to identify the same or similar elements. In the following description, for purposes of explanation and not limitation, specific details are set forth such as particular structures, architectures, interfaces, techniques. etc. in order to provide a thorough understanding of the various aspects of various embodiments. However, it will be apparent to those skilled in the art having the benefit of the present disclosure that the various aspects of the various embodiments may be practiced in other examples that depart from these specific details In certain instances, descriptions of well-known devices, circuits, and methods are omitted so as not to obscure the description of the various embodiments with unnecessary detail.

Embodiments herein may be related to radio layer 1 (RAN1) and fifth-generation (5G) wireless systems. Mobile communication has evolved significantly from early voice systems to today's highly sophisticated integrated communication platform. The next generation wireless communication system, 5G, will provide access to information and sharing of data over wide geographical areas, anytime by various users and applications. 5G is expected to be a unified network/system that targets vastly different and sometime conflicting performance dimensions and services. Such diverse multi-dimensional requirements are driven by different services and applications. In general, 5G will evolve based on 3GPP LTE-Advanced with additional potential new Radio Access Technologies (RATs) to enrich people lives with better, simple and seamless wireless connectivity solutions. 5G will enable wireless devices to deliver and receive rich contents and services at relatively high bandwidths.

Embodiments herein relate to mechanisms for transmission of UCI in one or more UL subframes or slots. As used herein, the term "slot" may refer to a single slot or to a multi-slot subframe. The UCI may include, without limitation. HARQ-ACK (including HARQ-NACK), CSI reports, BSI reports and/or BRI reports (UCI elements). In particular, embodiments may include mechanisms for sending CSI reports and beam related information reports via PUCCH and/or mechanisms for sending CSI and beam related information reporting on PUSCH resources in a slot that includes both DL and UL resource blocks.

Although the examples described herein may be described with respect to a TDD system, they can be extended to FDD systems. FDD systems use separate DL and UL slots. It is contemplated that the partitioning of the UCI described below may be used with a TDD or FDD system having separate DL and UL slots. When UL resources of a DL-UL slot or UL resources of dedicated UL slots, the examples either adjust the amount of UL data or adjust the UL resources to accommodate both HARQ-ACK feedback and other UCI, such as a CSI report, a BSI report and/or a BRI report.

The materials below describe an example network architecture and then describe mechanisms for low-latency transmission of UCI using slots having both DL and UL resource blocks.

FIG. 1 illustrates an architecture of a network 100 in accordance with some embodiments. The example network 100 includes user equipment (UE) 101 and UE 102. The UEs 101 and 102 are illustrated as smartphones (e.g., handheld, touchscreen, mobile computing devices connectable to one or more cellular networks), but may also comprise any mobile or non-mobile computing device, such as Personal Data Assistants (PDAs), pagers, laptop computers, desktop computers, tablet computers, wireless handsets, or any computing device including a wireless communications interface.

In some embodiments, any of the UEs 101 and 102 can include an Internet of Things (IoT) UE, which can include a network access layer designed for low-power IoT applications utilizing short-lived UE connections. An IoT UE can utilize technologies such as machine-to-machine (M2M) or machine-type communications (MTC) for exchanging data with an MTC server or device via a public land mobile network (PLMN). Proximity-Based Service (ProSe) or device-to-device (D2D) communication, sensor networks, or IoT networks. The M2M or MTC exchange of data may be a machine-initiated exchange of data. An IoT network describes interconnecting IoT UEs, which may include uniquely identifiable embedded computing devices (within the Internet infrastructure), having short-lived connections. The IoT UEs may execute background applications (e.g., keep-alive messages, status updates, etc.) to facilitate the connections of the IoT network.

The UEs 101 and 102 may be configured to connect, e.g., communicatively couple, with a radio access network (RAN) 110—the RAN 110 may be, for example, an Evolved Universal Mobile Telecommunications System (UMTS) Terrestrial Radio Access Network (E-UTRAN), a NextGen RAN (NG RAN), or some other type of RAN. The UEs 101 and 102 utilize connections 103 and 104, respectively, each of which comprises a physical communications interface or layer (discussed in further detail below); in this example, the connections 103 and 104 are illustrated as an air interface to enable communicative coupling, and can be consistent with cellular communications protocols, such as a Global System for Mobile Communications (GSM) protocol, a code-division multiple access (CDMA) network protocol, a Push-to-Talk (PTT) protocol, a PTT over Cellular (POC) protocol, a Universal Mobile Telecommunications System (UMTS) protocol, a 3GPP Long Term Evolution (LTE) protocol, a fifth generation (5G) protocol, a New Radio (NR) protocol, and the like.

In this embodiment, the UEs 101 and 102 may further directly exchange communication data via a ProSe interface 105. The ProSe interface 105 may alternatively be referred to as a sidelink interface comprising one or more logical channels, including but not limited to a Physical Sidelink Control Channel (PSCCH), a Physical Sidelink Shared Channel (PSSCH), a Physical Sidelink Discovery Channel (PSDCH), and a Physical Sidelink Broadcast Channel (PSBCH).

The UE 102 is shown to be configured to access an access point (AP) 106 via connection 107. The connection 107 can comprise a local wireless connection, such as a connection consistent with any IEEE 802.11 protocol, wherein the AP 106 would comprise a wireless fidelity (Wi Fi®) router. In this example, the AP 106 is shown to be connected to the Internet without connecting to the core network of the wireless system (described in further detail below).

The RAN 110 can include one or more access nodes that enable the connections 103 and 104. These access nodes (ANs) can be referred to as base stations (BSs), NodeBs, evolved NodeBs (eNBs), next Generation NodeBs (gNB), RAN nodes, and so forth, and can comprise ground stations (e.g., terrestrial access points) or satellite stations providing coverage within a geographic area (e.g., a cell). The RAN 110 may include one or more RAN nodes for providing macrocells. e.g., macro RAN node 111, and one or more RAN nodes for providing femtocells or picocells (e.g., cells having smaller coverage areas, smaller user capacity, or higher bandwidth compared to macrocells), e g., low power (LP) RAN node 112.

Any of the RAN nodes 111 and 112 can terminate the air interface protocol and can be the first point of contact for the UEs 101 and 102. In some embodiments, any of the RAN nodes 111 and 112 can fulfill various logical functions for the RAN N, 110 including, but not limited to, radio network controller (RNC) functions such as radio bearer management, uplink and downlink dynamic radio resource management and data packet scheduling, and mobility management.

In accordance with some embodiments, the UEs 101 and 102 can be configured to communicate using Orthogonal Frequency-Division Multiplexing (OFDM) communication signals with each other or with any of the RAN nodes 111 and 112 over a multicarrier communication channel in accordance various communication techniques, such as, but not limited to, an Orthogonal Frequency-Division Multiple Access (OFDMA) communication technique (e.g., for downlink communications) or a Single Carrier Frequency Division Multiple Access (SC-FDMA) communication technique (e.g., for uplink and ProSe or sidelink communications), although the scope of the embodiments is not limited in this respect. The OFDM signals can comprise a plurality of orthogonal subcarriers.

In some embodiments, a downlink resource grid can be used for downlink transmissions from any of the RAN nodes 111 and 112 to the UEs 101 and 102, while uplink transmissions can utilize similar techniques. The grid can be a time-frequency grid, called a resource grid or time-frequency resource grid, which is the physical resource in the downlink in each slot. Such a time-frequency plane representation is a common practice for OFDM systems, which makes it intuitive for radio resource allocation. Each column and each row of the resource grid corresponds to one OFDM symbol and one OFDM subcarrier, respectively. An example grid is described below with reference to FIGS. 11A-11D. The duration of the resource grid in the time domain corresponds to one slot in a radio frame. The smallest time-frequency unit in a resource grid is denoted as a resource element. Each resource grid comprises a number of resource blocks, which describe the mapping of certain physical channels to resource elements. Each resource block comprises a collection of resource elements; in the frequency domain, this may represent the smallest quantity of resources that currently can be allocated. There are several different physical downlink channels that are conveyed using such resource blocks.

The physical downlink shared channel (PDSCH) may carry user data and higher-layer signaling to the UEs 101 and 102. The physical downlink control channel (PDCCH) may carry information about the transport format and resource allocations related to the PDSCH channel, among other things. It may also inform the UEs 101 and 102 about the transport format, resource allocation, and HARQ (Hybrid Automatic Repeat Request) information related to the uplink shared channel. Typically, downlink scheduling (assigning control and shared channel resource blocks to the UE 102 within a cell) may be performed at any of the RAN nodes 111 and 112 based on channel quality information fed back from any of the UEs 101 and 102. The downlink resource assignment information may be sent on the PDCCH used for (e g., assigned to) each of the UEs 101 and 102.

The PDCCH may use control channel elements (CCEs) to convey the control information. Before being mapped to resource elements, the PDCCH complex-valued symbols may first be organized into quadruplets, which may then be permuted using a sub-block interleaver for rate matching. Each PDCCH may be transmitted using one or more of these CCEs, where each CCE may correspond to nine sets of four physical resource elements known as resource element groups (REGs). Four Quadrature Phase Shift Keying (QPSK) symbols may be mapped to each REG. The PDCCH can be transmitted using one or more CCEs, depending on the size of the downlink control information (DCI) and the channel condition. The DCI may include requests for channel state information (CSI), beam state information (BSI) and beam refinement information (BRI). There can be four or more different PDCCH formats defined in LTE with different numbers of CCEs (e.g., aggregation level, L=1, 2, 4, or 8).

Some embodiments may use concepts for resource allocation for control channel information that are an extension of the above-described concepts. For example, some embodiments may utilize an enhanced physical downlink control channel (EPDCCH) that uses PDSCH resources for control information transmission. The EPDCCH may be transmitted using one or more enhanced the control channel elements (ECCEs). Similar to above, each ECCE may correspond to nine sets of four physical resource elements known as an enhanced resource element groups (EREGs). An ECCE may have other numbers of EREGs in some situations.

Similarly, the physical uplink shared channel (PUSCH) may carry user data and higher-layer signaling from the UEs 101 and 102 to the RAN nodes 111 and/or 112. The physical uplink control channel (PUCCH) may carry scheduling requests (SRs), CSI reports and beam-related information, such as BSI and BRI reports, for multiple-antenna systems. It may also send information about the channel including HARQ-ACKs and NACKs (collectively referred to herein as HARQ-ACKs) from the UEs 101 and 102 to the nodes 111 and 112. Typically, uplink scheduling (assigning control and shared channel resource blocks to the UE 102 within a cell) may be performed at any of the RAN nodes 111 and 112 based on SRs and channel quality information fed back from any of the UEs 101 and 102. The uplink resource assignment information may be sent from the RAN nodes 111 and 112 to the UEs 101 and 102 via the PDCCH used for (e.g., assigned to) each of the UEs 101 and 102.

As described below with reference to FIG. 9, to enable low-latency transmission for enhanced mobile broadband communication, fifth-generation (5G) systems may employ a self-contained time-division duplex (TDD) slot structure that includes both DL and UL resources in one slot.

The RAN 110 is shown to be communicatively coupled to a core network (CN) 120 via an S1 interface 113. In embodiments, the CN 120 may be an evolved packet core (EPC) network, a NextGen Packet Core (NPC) network, or some other type of CN. In this embodiment the S1 interface 113 is split into two parts: the S1-U interface 114, which carries traffic data between the RAN nodes 111 and 112 and the serving gateway (S-GW) 122, and the S1-mobility management entity (MME) interface 115, which is a signaling interface between the RAN nodes 111 and 112 and MMEs 121.

In this embodiment, the CN 120 comprises the MMEs 121, the S-GW 122, the Packet Data Network (PDN) Gateway (P-GW) 123, and a home subscriber server (HSS) 124. The MMEs 121 may be similar in function to the control plane of legacy Serving General Packet Radio Service (GPRS) Support Nodes (SGSN). The MMEs 121 may manage mobility aspects in access such as gateway selection and tracking area list management. The HSS 124 may comprise a database for network users, including subscription-related information to support the network entities' handling of communication sessions. The CN 120 may comprise one or several HSSs 124, depending on the number of mobile subscribers, on the capacity of the equipment, on the organization of the network, etc. For example, the HSS 124 can provide support for routing/roaming, authentication, authorization, naming/addressing resolution, location dependencies, etc.

The S-GW 122 may terminate the S1 interface 113 towards the RAN 110, and routes data packets between the RAN 110 and the CN 120. In addition, the S-GW 122 may be a local mobility anchor point for inter-RAN node handovers and also may provide an anchor for inter-3GPP mobility. Other responsibilities may include lawful intercept, charging, and some policy enforcement.

The P-GW 123 may terminate an SGi interface toward a PDN. The P-GW 123 may route data packets between the EPC network 123 and external networks such as a network including the application server 130 (alternatively referred to as application function (AF)) via an Internet Protocol (IP) interface 125. Generally, the application server 130 may be an element offering applications that use IP bearer resources with the core network (e.g., UMTS Packet Services (PS) domain, LTE PS data services, etc). In this embodiment, the P-GW 123 is shown to be communicatively coupled to an application server 130 via an IP communications interface 125. The application server 130 can also be configured to support one or more communication services (e.g., Voice-over-Internet Protocol (VoIP) sessions, PTT sessions, group communication sessions, social networking services, etc) for the UEs 101 and 102 via the CN 120.

The P-GW 123 may further be a node for policy enforcement and charging data collection. Policy and Charging Enforcement Function (PCRF) 126 is the policy and charging control element of the CN 120. In a non-roaming scenario, there may be a single PCRF in the Home Public Land Mobile Network (HPLMN) associated with a UE's Internet Protocol Connectivity Access Network (IP-CAN) session. In a roaming scenario with local breakout of traffic, there may be two PCRFs associated with a UE's IP-CAN session: a Home PCRF (H-PCRF) within a HPLMN and a Visited PCRF (V-PCRF) within a Visited Public Land Mobile Network (VPLMN). The PCRF 126 may be communicatively coupled to the application server 130 via the P-GW 123. The application server 130 may signal the PCRF 126 to indicate a new service flow and select the appropriate Quality of Service (QoS) and charging parameters. The PCRF 126 may provision this rule into a Policy and Charging Enforcement Function (PCEF) (not shown) with the appropriate traffic flow template (TFT) and QoS class of identifier (QCI), which commences the QoS and charging as specified by the application server 130.

Figure 2:
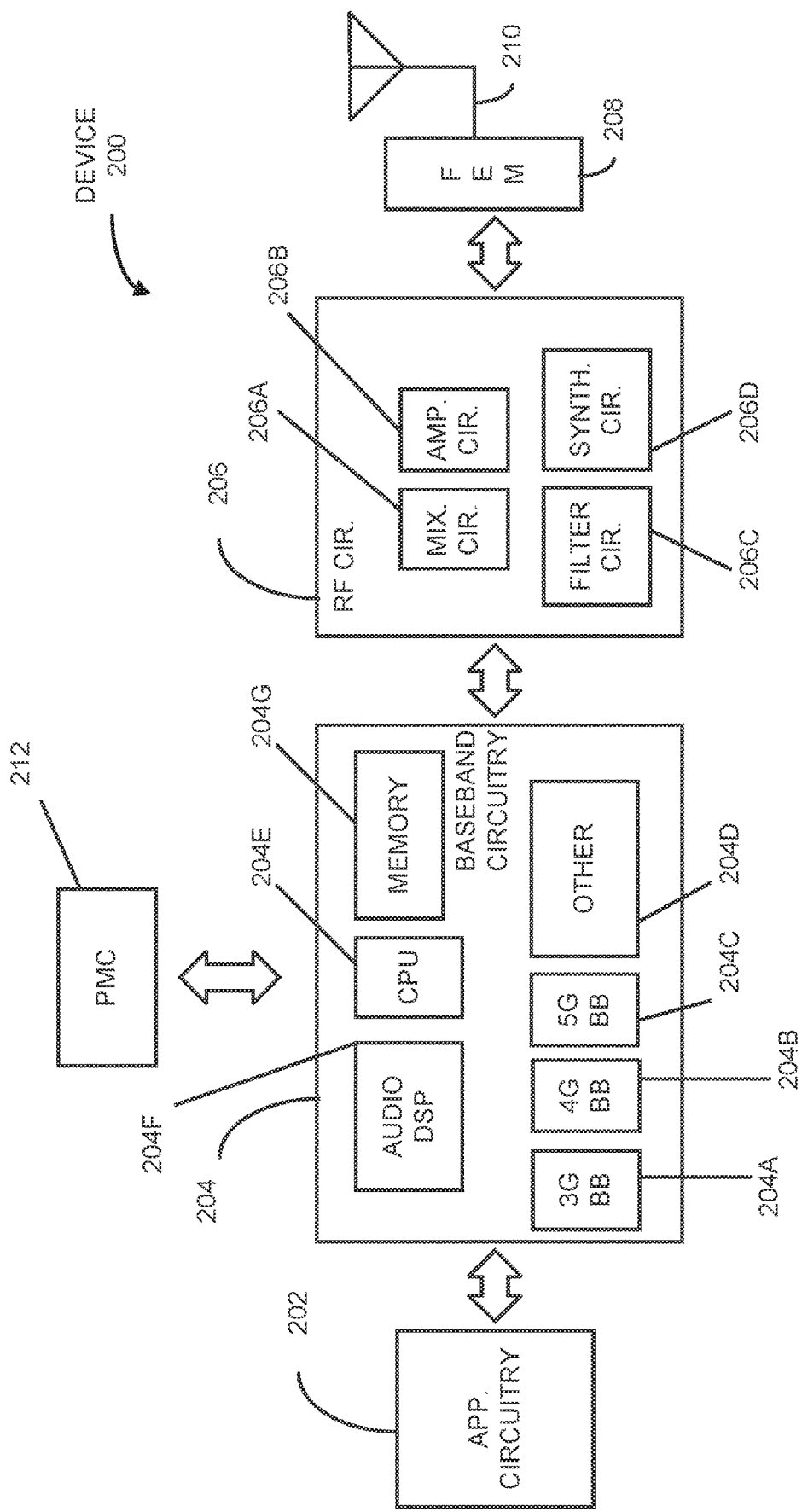
FIG. 2 illustrates example components of a UE or radio access network (RAN) device in accordance with some embodiments.

FIG. 2 illustrates example components of a device 200 in accordance with some embodiments. In some embodiments, the device 200 may include application circuitry 202, baseband circuitry 204, Radio Frequency (RF) circuitry 206, front-end module (FEM) circuitry 208, one or more antennas 210, and power management circuitry (PMC) 212 coupled together at least as shown. The components of the illustrated device 200 may be included in a UE or a RAN node. In some embodiments, the device 200 may include fewer elements (e.g., a RAN node may not utilize application circuitry 202, and instead include a processor/controller to process IP data received from an EPC). In some embodiments, the device 200 may include additional elements such as, for example, memory/storage, display, camera, sensor, or input/output (I/O) interface In other embodiments, the components described below may be included in more than one device (e.g., said circuitries may be separately included m more than one device for Cloud-RAN (C-RAN) implementations).

The application circuitry 202 may include one or more application processors. For example, the application circuitry 202 may include circuitry such as, but not limited to, one or more single-core or multi-core processors. The processor(s) may include any combination of general-purpose processors and dedicated processors (e.g., graphics processors, application processors, etc.). The processors may be coupled with or may include memory/storage and may be configured to execute instructions stored in the memory/storage to enable various applications or operating systems to run on the device 200. In some embodiments, processors of application circuitry 202 may process IP data packets received from an EPC.

The baseband circuitry 204 may include circuitry such as, but not limited to, one or more single-core or multi-core processors. The baseband circuitry 204 may include one or more baseband processors or control logic to process baseband signals received from a receive signal path of the RF circuitry 206 and to generate baseband signals for a transmit signal path of the RF circuitry 206. Baseband processing circuity 204 may interface with the application circuitry 202 for generation and processing of the baseband signals and for controlling operations of the RF circuitry 206. For example, in some embodiments, the baseband circuitry 204 may include a third generation (3G) baseband processor 204A, a fourth generation (4G) baseband processor 204B, a fifth generation (5G) baseband processor 204C, or other baseband processor(s) 204D for other existing generations, generations in development or to be developed in the future (e.g., second generation (2G), sixth generation (6G), etc.). The baseband circuitry 204 (e.g., one or more of baseband processors 204A-D) may handle various radio control functions that enable communication with one or more radio networks via the RF circuitry 206. In other embodiments, some or all of the functionality of baseband processors 204A-D may be included in modules stored in the memory 204G and executed via a Central Processing Unit (CPU) 204E. The radio control functions may include, but are not limited to, signal modulation/demodulation, encoding/decoding, radio frequency shifting, etc. In some embodiments, modulation/demodulation circuitry of the baseband circuitry 204 may include Fast-Fourier Transform (FFT), precoding, or constellation mapping/demapping functionality. In some embodiments, encoding/decoding circuitry of the baseband circuitry 204 may include convolution, tail-biting convolution, turbo, Viterbi. or Low Density Parity Check (LDPC) encoder/decoder functionality. Embodiments of modulation/demodulation and encoder/decoder functionality are not limited to these examples and may include other suitable functionality in other embodiments.

In some embodiments (e.g. UEs), the baseband circuitry 204 may include one or more audio digital signal processor(s) (DSP) 204F. The audio DSP(s) 204F may be include elements for compression/decompression and echo cancellation and may include other suitable processing elements in other embodiments. Components of the baseband circuitry may be suitably combined in a single chip, a single chipset, or disposed on a same circuit board in some embodiments. In some embodiments, some or all of the constituent components of the baseband circuitry 204 and the application circuitry 202 may be implemented together such as, for example, on a system on a chip (SOC).

In some embodiments, the baseband circuitry 204 may provide for communication compatible with one or more radio technologies. For example, in some embodiments, the baseband circuitry 204 may support communication with an evolved universal terrestrial radio access network (EU-TRAN) or other wireless metropolitan area networks (WMAN), a wireless local area network (WLAN), a wireless personal area network (WPAN). Embodiments in which the baseband circuitry 204 is configured to support radio communications of more than one wireless protocol may be referred to as multi-mode baseband circuitry.

RF circuitry 206 may enable communication with wireless networks using modulated electromagnetic radiation through a non-solid medium. In various embodiments, the RF circuitry 206 may include switches, filters, amplifiers, etc. to facilitate the communication with the wireless network. RF circuitry 206 may include a receive signal path which may include circuitry to down-convert RF signals received from the FEM circuitry 208 and provide baseband signals to the baseband circuitry 204. RF circuitry 206 may also include a transmit signal path which may include circuitry to up-convert baseband signals provided by the baseband circuitry 204 and provide RF output signals to the FEM circuitry 208 for transmission.

In some embodiments, the receive signal path of the RF circuitry 206 may include mixer circuitry 206A, amplifier circuitry 206B and filter circuitry 206C. In some embodiments, the transmit signal path of the RF circuitry 206 may include filter circuitry 206C and mixer circuitry 206A. RF circuitry 206 may also include synthesizer circuitry 206D for synthesizing a frequency for use by the mixer circuitry 206A of the receive signal path and the transmit signal path. In some embodiments, the mixer circuitry 206A of the receive signal path may be configured to down-convert RF signals received from the FEM circuitry 208 based on the synthesized frequency provided by synthesizer circuitry 206D. The amplifier circuitry 206B may be configured to amplify the down-converted signals and the filter circuitry 206C may be a low-pass filter (LPF) or band-pass filter (BPF) configured to remove unwanted signals from the down-converted signals to generate output baseband signals. Output baseband signals may be provided to the baseband circuitry 204 for further processing. In some embodiments, the output baseband signals may be zero-frequency baseband signals, although this is not a requirement. In some embodiments, mixer circuitry 206A of the receive signal path may comprise passive mixers, although the scope of the embodiments is not limited in this respect.

In some embodiments, the mixer circuitry 206A of the transmit signal path may be configured to up-convert input baseband signals based on the synthesized frequency provided by the synthesizer circuitry 206D to generate RF output signals for the FEM circuitry 208. The baseband signals may be provided by the baseband circuitry 204 and may be filtered by filter circuitry 206C.

In some embodiments, the mixer circuitry 206A of the receive signal path and the mixer circuitry 206A of the transmit signal path may include two or more mixers and may be arranged for quadrature downconversion and upconversion, respectively In some embodiments, the mixer circuitry 206A of the receive signal path and the mixer circuitry 206A of the transmit signal path may include two or more mixers and may be arranged for image rejection (e.g., Hartley image rejection). In some embodiments, the mixer circuitry 206A of the receive signal path and the mixer circuitry 206A may be arranged for direct downconversion and direct upconversion, respectively. In some embodiments, the mixer circuitry 206A of the receive signal path and the mixer circuitry 206A of the transmit signal path may be configured for super-heterodyne operation.

In some embodiments, the output baseband signals and the input baseband signals may be analog baseband signals, although the scope of the embodiments is not limited in this respect In some alternate embodiments, the output baseband signals and the input baseband signals may be digital baseband signals. In these alternate embodiments, the RF circuitry 206 may include analog-to-digital converter (ADC) and digital-to-analog converter (DAC) circuitry and the baseband circuitry 204 may include a digital baseband interface to communicate with the RF circuitry 206.

In some dual-mode embodiments, a separate radio IC circuitry may be provided for processing signals for each spectrum, although the scope of the embodiments is not limited in this respect.

In some embodiments, the synthesizer circuitry 206D may be a fractional-N synthesizer or a fractional N/N+1 synthesizer, although the scope of the embodiments is not limited in this respect as other types of frequency synthesizers may be suitable. For example, synthesizer circuitry 206D may be a delta-sigma synthesizer, a frequency multiplier, or a synthesizer comprising a phase-locked loop with a frequency divider.

The synthesizer circuitry 206D may be configured to synthesize an output frequency for use by the mixer circuitry 206A of the RF circuitry 206 based 2o on a frequency input and a divider control input. In some embodiments, the synthesizer circuitry 206D may be a fractional N/N+1 synthesizer.

In some embodiments, frequency input may be provided by a voltage controlled oscillator (VCO), although that is not a requirement. Divider control input may be provided by either the baseband circuitry 204 or the applications processor 202 depending on the desired output frequency. In some embodiments, a divider control input (e.g., N) may be determined from a look-up table based on a channel indicated by the applications processor 202.

Synthesizer circuitry 206D of the RF circuitry 206 may include a divider, a delay-locked loop (DLL), a multiplexer and a phase accumulator. In some embodiments, the divider may be a dual modulus divider (DMD) and the phase accumulator may be a digital phase accumulator (DPA). In some embodiments, the DMD may be configured to divide the input signal by either N or N+1 (e.g., based on a carry out) to provide a fractional division ratio. In some example embodiments, the DLL may include a set of cascaded, tunable, delay elements, a phase detector, a charge pump and a D-type flip-flop. In these embodiments, the delay elements may be configured to break a VCO period up into Nd equal packets of phase, where Nd is the number of delay elements in the delay line. In this way, the DLL provides negative feedback to help ensure that the total delay through the delay line is one VCO cycle.

In some embodiments, synthesizer circuitry 206D may be configured to generate a carrier frequency as the output frequency, while in other embodiments, the output frequency may be a multiple of the carrier frequency (e.g., twice the carrier frequency, four times the carrier frequency) and used in conjunction with quadrature generator and divider circuitry to generate multiple signals at the carrier frequency with multiple different phases with respect to each other. In some embodiments, the output frequency may be a LO frequency (fLO). In some embodiments, the RF circuitry 206 may include an IQ/polar converter.

FEM circuitry 208 may include a receive signal path which may include circuitry configured to operate on RF signals received from one or more antennas 210, amplify the received signals and provide the amplified versions of the received signals to the RF circuitry 206 for further processing. FEM circuitry 208 may also include a transmit signal path which may include circuitry configured to amplify signals for transmission provided by the RF circuitry 206 for transmission by one or more of the one or more antennas 210. In various embodiments, the amplification through the transmission or reception signal paths may be solely in the RF circuitry 206, solely in the FEM 208, or in both the RF circuitry 206 and the FEM 208.

In some embodiments, the FEM circuitry 208 may include a TX/RX switch to switch between transmit mode and receive mode operation. The FEM circuitry may include a receive signal path and a transmit signal path. The receive signal path of the FEM circuitry may include an LNA to amplify received RF signals and provide the amplified received RF signals as an output (e.g., to the RF circuitry 206). The transmit signal path of the FEM circuitry 208 may include a power amplifier (PA) to amplify input RF signals (e.g., provided by RF circuitry 206), and one or more filters to generate RF signals for subsequent transmission (e g., by one or more of the one or more antennas 210).

In some embodiments, the PMC 212 may manage power provided to the baseband circuitry 204. In particular, the PMC 212 may control power-source selection, voltage scaling, battery charging, or DC-to-DC conversion. The PMC 212 may often be included when the device 200 is capable of being powered by a battery, for example, when the device is included in a UE. The PMC 212 may increase the power conversion efficiency while providing desirable implementation size and heat dissipation characteristics.

While FIG. 2 shows the PMC 212 coupled only with the baseband circuitry 204. However, in other embodiments, the PMC 212 may be additionally or alternatively coupled with, and perform similar power management operations for, other components such as, but not limited to, application circuitry 202, RF circuitry 206, or FEM 208.

In some embodiments, the PMC 212 may control, or otherwise be part of, various power saving mechanisms of the device 200. For example, when the device 200 is in an RRC_Connected state, where it is still connected to the RAN node as it expects to receive traffic shortly, then it may enter a state known as Discontinuous Reception Mode (DRX) after a period of inactivity. During this state, the device 200 may power down for brief intervals of time and thus save power.

When there is no data traffic activity for an extended period of time, then the device 200 may transition off to an RRC_Idle state, where it disconnects from the network and does not perform operations such as channel quality feedback, handover, etc. The device 200 goes into a very low power state and it performs paging where again it periodically wakes up to listen to the network and then powers down again. The device 200 may not receive data in this state, in order to receive data, it must transition back to RRC_Connected state.

An additional power saving mode may allow a device to be unavailable to the network for periods longer than a paging interval (ranging from seconds to a few hours). During this time, the device is totally unreachable to the network and may power down completely. Any data sent during this time incurs a large delay and it is assumed the delay is acceptable.

Processors of the application circuitry 202 and processors of the baseband circuitry 204 may be used to execute elements of one or more instances of a protocol stack. For example, processors of the baseband circuitry 204, alone or in combination, may be used execute Layer 3, Layer 2, or Layer 1 functionality, while processors of the application circuitry 204 may utilize data (e.g., packet data) received from these layers and further execute Layer 4 functionality (e.g., transmission communication protocol (TCP) and user datagram protocol (UDP) layers). As referred to herein. Layer 3 may comprise a radio resource control (RRC) layer, described in further detail below. As referred to herein, Layer 2 may comprise a medium access control (MAC) layer, a radio link control (RLC) layer, and a packet data convergence protocol (PDCP) layer, described in further detail below. As referred to herein. Layer 1 may comprise a physical (PHY) layer of a UE/RAN node, described in further detail below.

Figure 3:
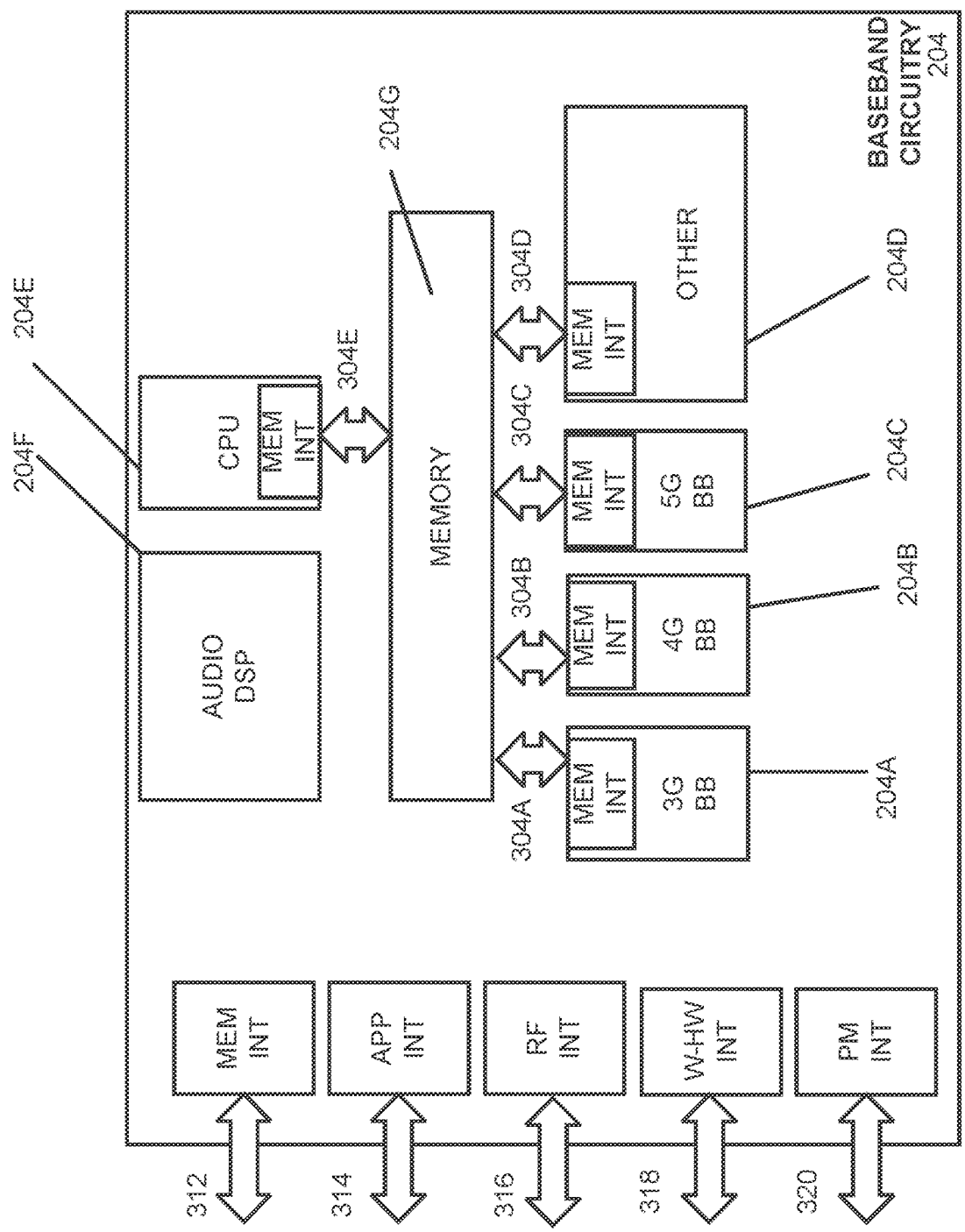
FIG. 3 illustrates example interfaces of baseband circuitry in accordance with some embodiments.

FIG. 3 illustrates example interfaces of baseband circuitry in accordance with some embodiments. As discussed above, the baseband circuitry 204 of FIG. 2 may comprise processors 204A-204E and a memory 204G utilized by said processors. Each of the processors 204A-204E may include a memory interface, 304A-304E, respectively, to send-receive data to/from the memory 204G.

The baseband circuitry 204 may further include one or more interfaces to communicatively couple to other circuitries/devices, such as a memory interface 312 (e g., an interface to send/receive data to/from memory external to the baseband circuitry 204), an application circuitry interface 314 (e.g., an interface to send/receive data to/from the application circuitry 202 of FIG. 2), an RF circuitry interface 316 (e g., an interface to send/receive data to/from RF circuitry 206 of FIG. 2), a wireless hardware connectivity interface 318 (e.g., an interface to send/receive data to/from Near Field Communication (NFC) components, Bluetooth® components (e.g., Bluetooth® Low Energy). Wi-Fi® components, and other communication components), and a power management interface 320 (e.g., an interface to send/receive power or control signals to/from the PMC 212).

Figure 4:
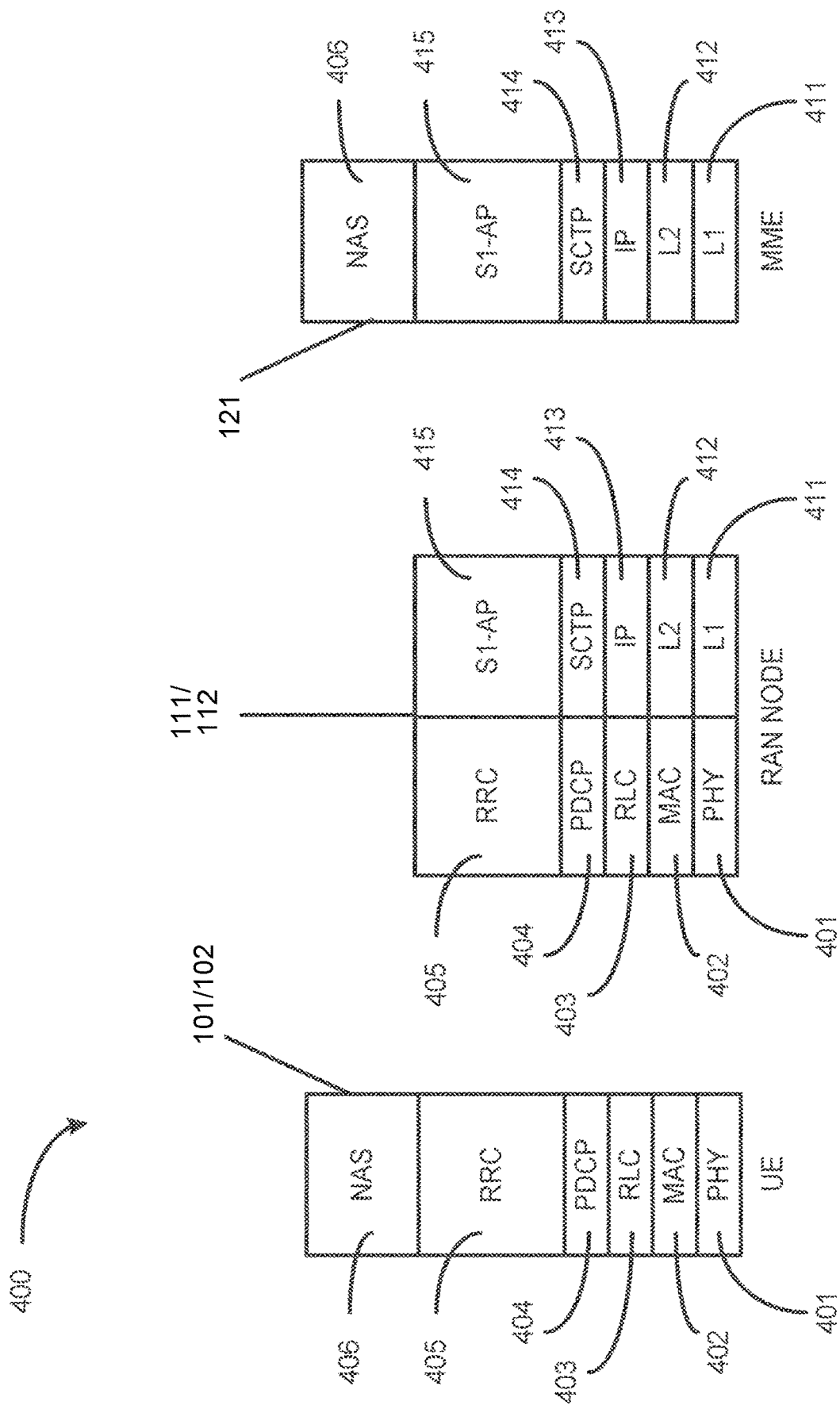
FIG. 4 is an illustration of a control plane protocol stack in accordance with some embodiments.

FIG. 4 is an illustration of a control plane protocol stack in accordance with some embodiments. In this embodiment, a control plane 400 is shown as a communications protocol stack between the UE 101 (or alternatively, the UE 102), the RAN node 111 (or alternatively, the RAN node 112), and the MME 121.

The PHY layer 401 may transmit or receive information used by the MAC; layer 402 over one or more air interfaces. The PHY layer 401 may further perform link adaptation or adaptive modulation and coding (AMC), power control, cell search (e.g., for initial synchronization and handover purposes), and other measurements used by higher layers, such as the RRC layer 405. The PHY layer 401 may still further perform error detection on the transport channels, forward error correction (FEC) coding/decoding of the transport channels, modulation/demodulation of physical channels, interleaving, rate matching, mapping onto physical channels, and Multiple Input Multiple Output (MIMO) antenna processing.

The MAC layer 402 may perform mapping between logical channels and transport channels, multiplexing of MAC service data units (SDUs) from one or more logical channels onto transport blocks (TB) to be delivered to PHY via transport channels, de-multiplexing MAC SDUs to one or more logical channels from transport blocks (TB) delivered from the PHY via transport channels, multiplexing MAC SDUs onto TBs, scheduling information reporting, error correction through hybrid automatic repeat request (HARQ), and logical channel prioritization.

The RLC layer 403 may operate in a plurality of modes, including: Transparent Mode (TM). Unacknowledged Mode (UM), and Acknowledged Mode (AM). The RLC layer 403 may execute transfer of upper layer protocol data units (PDUs), error correction through automatic repeat request (ARQ) for AM data transfers, and concatenation, segmentation and reassembly of RLC SDUs for UM and AM data transfers. The RLC layer 403 may also execute re-segmentation of RLC data PDUs for AM data transfers, reorder RLC data PDUs for UM and AM data transfers, detect duplicate data for UM and AM data transfers, discard RLC SDUs for UM and AM data transfers, detect protocol errors for AM data transfers, and perform RLC re-establishment.

The PDCP layer 404 may execute header compression and decompression of IP data, maintain PDCP Sequence Numbers (SNs), perform in-sequence delivery of upper layer PDUs at re-establishment of lower layers, eliminate duplicates of lower layer SDUs at re-establishment of lower layers for radio bearers mapped on RLC AM, cipher and decipher control plane data, perform integrity protection and integrity verification of control plane data, control tinier-based discard of data, and perform security operations (e.g., ciphering, deciphering, integrity protection, integrity verification, etc.).

The main services and functions of the RRC layer 405 may include broadcast of system information (e.g., included in Master Information Blocks (MIBs) or System Information Blocks (SIBs) related to the non-access stratum (NAS)), broadcast of system information related to the access stratum (AS), paging, establishment, maintenance and release of an RRC connection between the UE and E-UTRAN (e.g., RRC connection paging, RRC connection establishment, RRC connection modification, and RRC connection release), establishment, configuration, maintenance and release of point to point Radio Bearers, security functions including key management, inter radio access technology (RAT) mobility, and measurement configuration for UE measurement reporting. Said MIBs and SIBs may comprise one or more information elements (IEs), which may each comprise individual data fields or data structures.

The UE 101 and the RAN node 111 may utilize a Uu interface (e.g., an LTE-Uu interface) to exchange control plane data via a protocol stack comprising the PHY layer 401, the MAC layer 402, the RLC layer 403, the PDCP layer 404, and the RRC layer 405.

The non-access stratum (NAS) protocols 406 form the highest stratum of the control plane between the UE 101 and the MME 121. The NAS protocols 406 support the mobility of the UE 101 and the session management procedures to establish and maintain IP connectivity between the UE 101 and the P-GW 123.

The S1 Application Protocol (S1-AP) layer 415 may support the functions of the S1 interface and comprise Elementary Procedures (EPs). An EP is a unit of interaction between the RAN node 11 and the CN 120. The S1-AP layer services may comprise two groups. UE-associated services and non UE-associated services. These services perform functions including, but not limited to: E-UTRAN Radio Access Bearer (E-RAB) management, UE capability indication, mobility, NAS signaling transport. RAN Information Management (RIM), and configuration transfer.

The Stream Control Transmission Protocol (SCTP) layer (alternatively referred to as the SCTP/IP layer) 414 may ensure reliable delivery of signaling messages between the RAN node 111 and the MME 121 based, in part, on the IP protocol, supported by the IP layer 413. The L2 layer 412 and the L1 layer 411 may refer to communication links (e.g., wired or wireless) used by the RAN node and the MME to exchange information.

The RAN node 111 and the MME 121 may utilize an S1-MME interface to exchange control plane data via a protocol stack comprising the L1 layer 411, the L2 layer 412, the IP layer 413, the SCTP layer 414, and the S1-AP layer 415.

Figure 5:
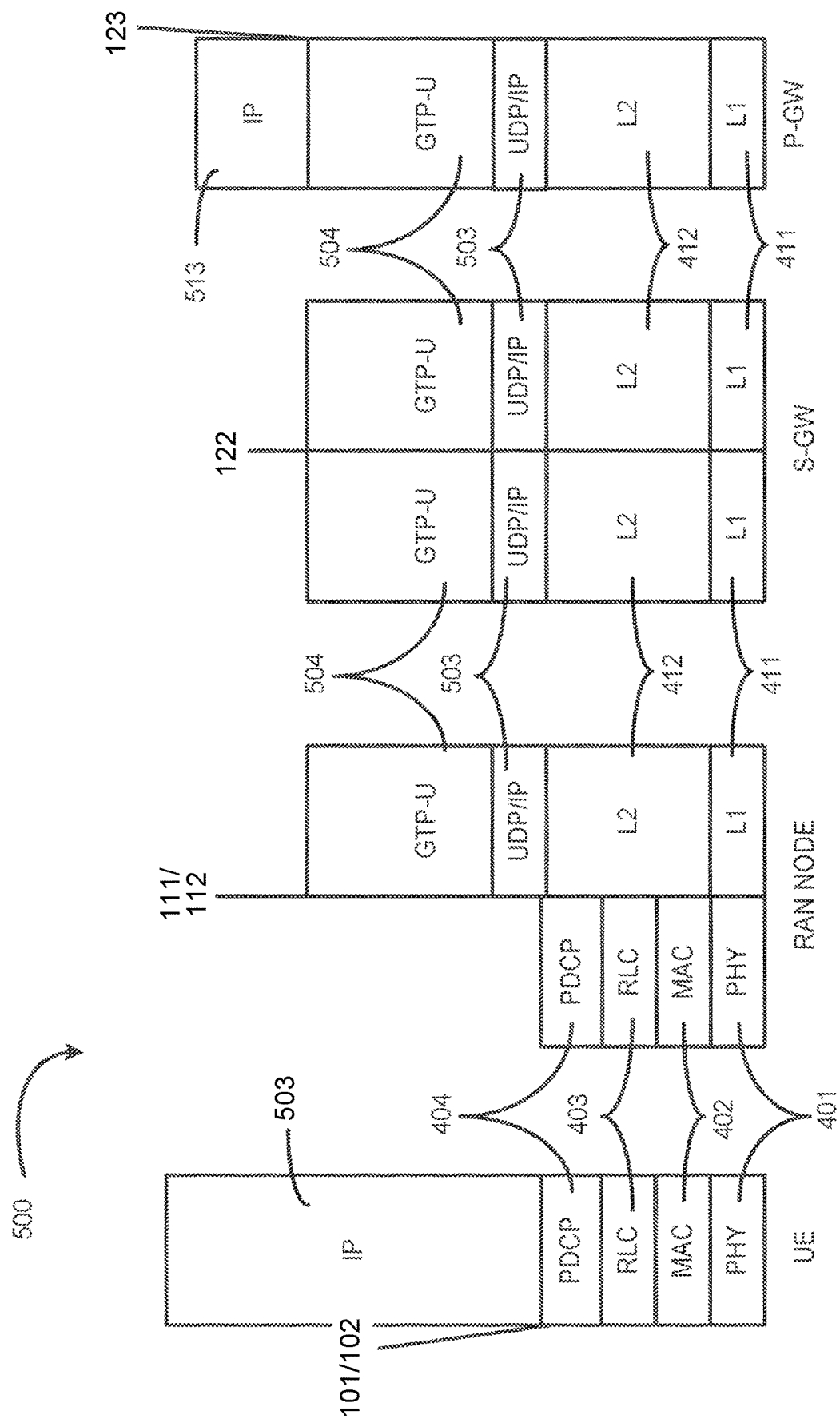
FIG. 5 is an illustration of a user plane protocol stack in accordance with some embodiments.

FIG. 5 is an illustration of a user plane protocol stack m accordance with some embodiments. In this embodiment, a user plane 500 is shown as a communications protocol stack between the UE 101 (or alternatively, the UE 102), the RAN node 111 (or alternatively, the RAN node 112), the S-GW 122, and the P-GW 123. The user plane 500 may utilize at least some of the same protocol layers as the control plane 400. For example, the UE 101 and the RAN node 111 may utilize a Uu interface (e.g., an LTE-Uu interface) to exchange user plane data via a protocol stack comprising the PHY layer 401, the MAC layer 402, the RLC layer 403, and the PDCP layer 404.

The General Packet Radio Service (GPRS) Tunneling Protocol for the user plane (GTP-U) layer 504 may be used for carrying user data within the GPRS core network and between the radio access network and the core network. The user data transported can be packets in any of IPv4, IPv6, or PPP formats, for example. The UDP and IP security (UDP/IP) layer 503 may provide checksums for data integrity, port numbers for addressing different functions at the source and destination, and encryption and authentication on the selected data flows. The RAN node 11 and the S-GW 122 may utilize an S1-U interface to exchange user plane data via a protocol stack comprising the L1 layer 411, the L2 layer 412, the UDP/IP layer 503, and the GTP-U layer 504. The S-GW 122 and the P-GW 123 may utilize an S5/S8a interface to exchange user plane data via a protocol stack comprising the L1 layer 411, the L2 layer 412, the UDP/IP layer 503, and the GTP-U layer the session management procedures to establish and maintain IP connectivity between the UE 101 and the P-GW 123.

Figure 6:
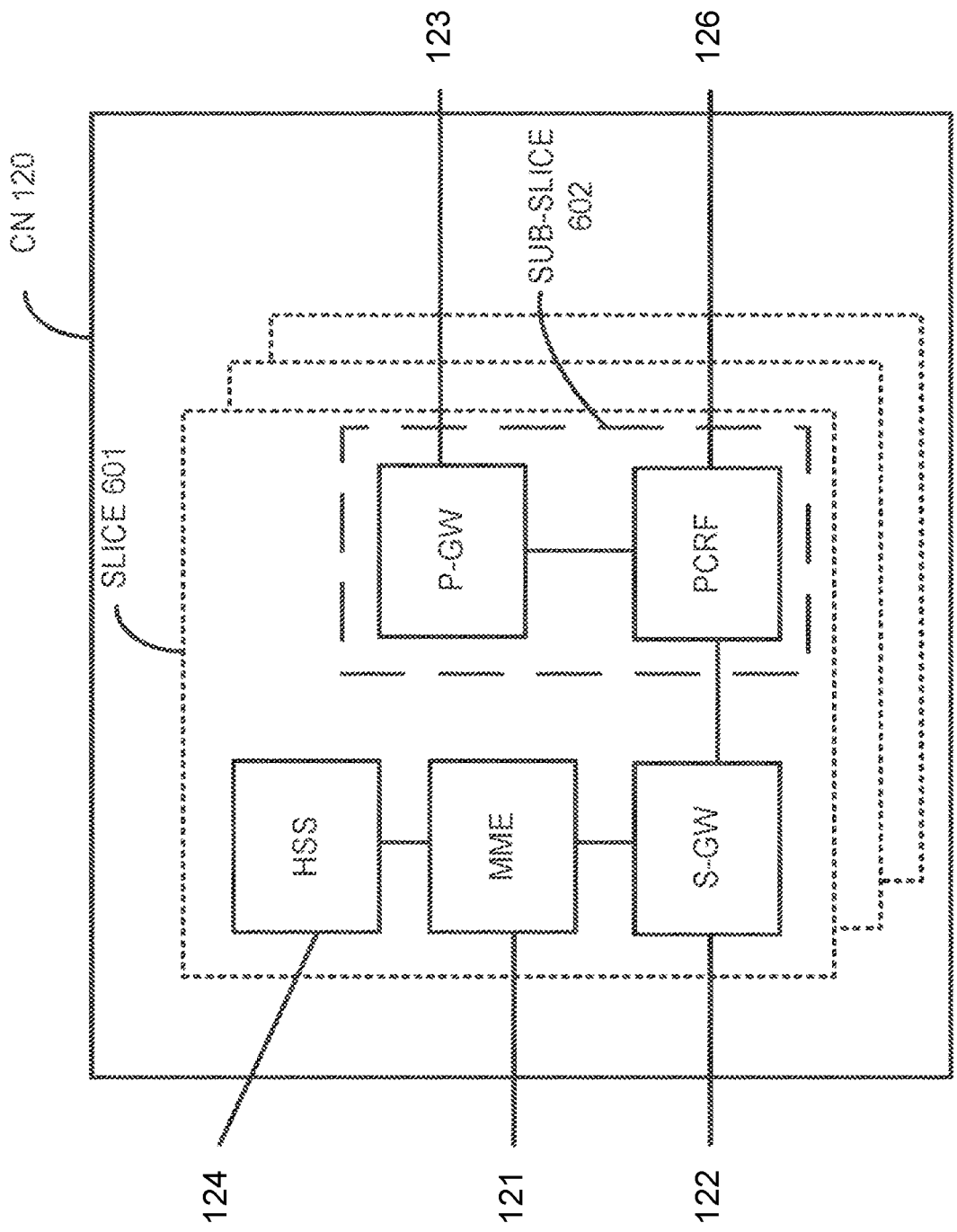
FIG. 6 illustrates components of a core network in accordance with some embodiments.

FIG. 6 illustrates components of a core network in accordance with some embodiments. The components of the CN 120 may be implemented in one physical node or separate physical nodes including components to read and execute instructions from a machine-readable or computer-readable medium (e.g., a non-transitory machine-readable storage medium). In some embodiments. Network Functions Virtualization (NFV) is utilized to virtualize any or all of the above described network node functions via executable instructions stored in one or more computer readable storage mediums (described in further detail below). A logical instantiation of the CN 120 may be referred to as a network slice 601. A logical instantiation of a portion of the CN 120 may be referred to as a network sub-slice 602 (e.g., the network sub-slice 602 is shown to include the PGW 123 and the PCRF 126).

NFV architectures and infrastructures may be used to virtualize one or more network functions, alternatively performed by proprietary hardware, onto physical resources comprising a combination of industry-standard server hardware, storage hardware, or switches. In other words, NFV systems can be used to execute virtual or reconfigurable implementations of one or more EPC components/functions.

Figure 7:
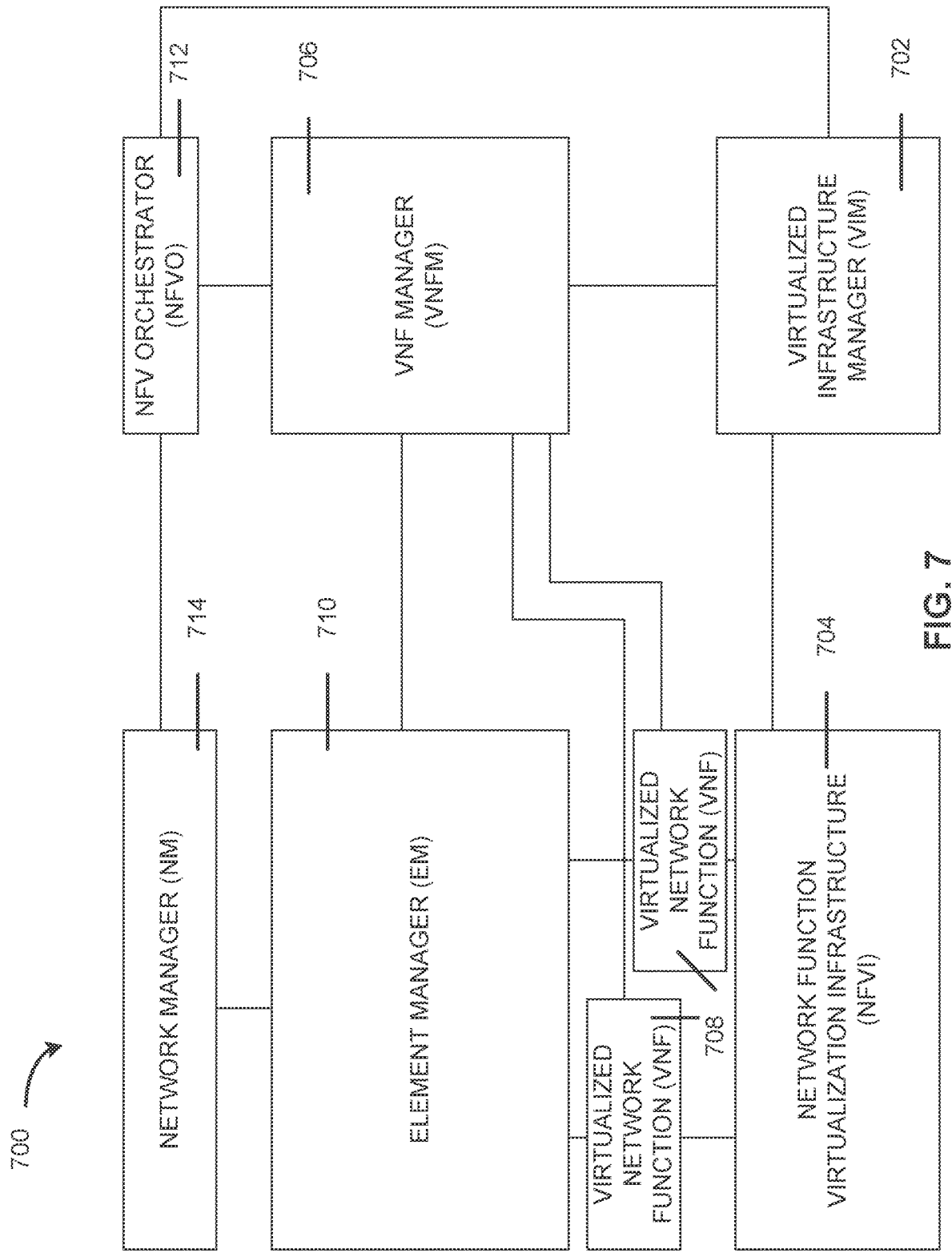
FIG. 7 is a block diagram illustrating hardware and software components, according to some example embodiments.

FIG. 7 is a block diagram illustrating components, according to some example embodiments, of a system 700 to support NFV. The system 700 is illustrated as including a virtualized infrastructure manager (VIM) 702, a network function virtualization infrastructure (NFVI) 704, a VNF manager (VNFM) 706, virtualized network functions (VNFs) 708, an element manager (EM) 710, an NFV Orchestrator (NFVO) 712, and a network manager (NM) 714.

The VIM 702 manages the resources of the NFVI 704. The NFVI 704 can include physical or virtual resources and applications (including hypervisors) used to execute the system 700. The VIM 702 may manage the life cycle of virtual resources with the NFVI 704 (e.g., creation, maintenance, and tear down of virtual machines (VMs) associated with one or more physical resources), track VM instances, track performance, fault and security of VM instances and associated physical resources, and expose VM instances and associated physical resources to other management systems.

The VNFM 706 may manage the VNFs 708. The VNFs 708 may be used to execute EPC components/functions. The VNFM 706 may manage the life cycle of the VNFs 708 and track performance, fault and security of the virtual aspects of VNFs 708. The EM 710 may track the performance, fault and security of the functional aspects of VNFs 708. The tracking data from the VNFM 706 and the EM 710 may comprise, for example, performance measurement (PM) data used by the VIM 702 or the NFVI 704. Both the VNFM 706 and the EM 710 can scale up/down the quantity of VNFs of the system 700.

The NFVO 712 may coordinate, authorize, release and engage resources of the NFVI 704 in order to provide the requested service (e.g., to execute an EPC function, component, or slice). The NM 714 may provide a package of end-user functions with the responsibility for the management of a network, which may include network elements with VNFs, non-virtualized network functions, or both (management of the VNFs may occur via the EM 710).

Figure 8:
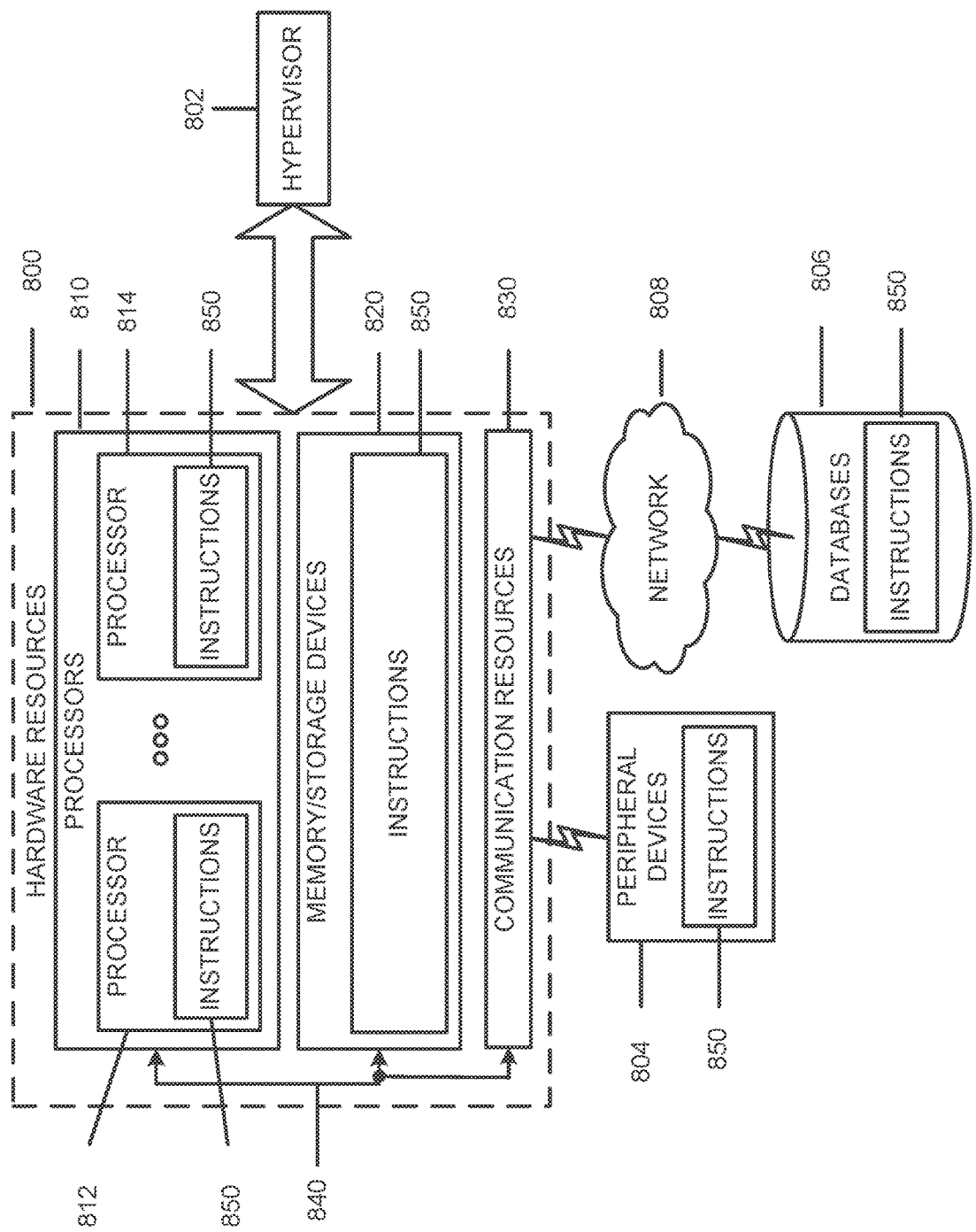
FIG. 8 is a block diagram illustrating hardware resource components, according to some example embodiments

FIG. 8 is a block diagram illustrating components, according to some example embodiments, able to read instructions from a machine-readable or computer-readable medium (e.g., a non-transitory machine-readable storage medium) and perform any one or more of the methodologies discussed herein. The components shown in FIG. 8 may be used in a UE or a RAN node such as a gNB or eNB. Specifically. FIG. 8 shows a diagrammatic representation of hardware resources 800 including one or more processors (or processor cores) 810, one or more memory/storage devices 820, and one or more communication resources 830, each of which may be communicatively coupled via a bus 840. For embodiments where node virtualization (e.g., NFV) is utilized, a hypervisor 802 may be executed to provide an execution environment for one or more network slices/sub-slices to utilize the hardware resources 800.

The processors 810 (e.g., a central processing unit (CPU), a reduced instruction set computing (RISC) processor, a complex instruction set computing (CISC) processor, a graphics processing unit (GPU), a digital signal processor (DSP) such as a baseband processor, an application specific integrated circuit (ASIC), a radio-frequency integrated circuit (RFIC), another processor, or any suitable combination thereof) may include, for example, a processor 812 and a processor 814.

The memory/storage devices 820 may include main memory, disk storage, or any suitable combination thereof. The memory/storage devices 820 may include, but are not limited to any type of volatile or non-volatile memory such as dynamic random access memory (DRAM), static random-access memory (SRAM), erasable programmable read-only memory (EPROM), electrically erasable programmable read-only memory (EEPROM). Flash memory, solid-state storage, etc.

The communication resources 830 may include interconnection or network interface components or other suitable devices to communicate with one or more peripheral devices 804 or one or more databases 806 via a network 808. For example, the communication resources 830 may include wired communication components (e.g., for coupling via a Universal Serial Bus (USB)), cellular communication components, NFC components. Bluetooth® components (e.g., Bluetooth® Low Energy), Wi-Fi®, components, and other communication components.

Instructions 850 may comprise software, a program, an application, an applet, an app, or other executable code for causing at least any of the processors 810 to perform any one or more of the methodologies discussed herein. The instructions 850 may reside, completely or partially, within at least one of the processors 810 (e.g., within the processor's cache memory), the memory/storage devices 820, or any suitable combination thereof. Furthermore, any portion of the instructions 850 may be transferred to the hardware resources 800 from any combination of the peripheral devices 804 or the databases 806. Accordingly, the memory of processors 810, the memory/storage devices 820, the peripheral devices 804, and the databases 806 are examples of computer-readable and machine-readable media.

The systems described above may be used for UL and DL exchanging data frames among the UEs 101 and 102 and the RAN nodes 110 and 112. In some example embodiments, each frame may include multiple slots, where each slot includes multiple symbols (e.g. seven or 14) in the time domain, where each symbol includes a number, M, modulated subcarriers in the frequency domain. The modulated subcarriers in a slot are divided into resource blocks. Typically, each resource block includes seven or 14 symbols and each symbol is represented by 12 modulated subcarriers. The subcarriers are mutually orthogonal having a spacing of between 15 kHz and 480 KHz. Each subcarrier may be modulated using quadrature phase shift keying (QPSK), 16 quadrature amplitude modulation (16QAM), 64QAM or 256QAM. Multiple resource blocks may be divided among multiple UEs. In order to effectively transmit downlink data, it is desirable for the base station to continually know the UCI of the channel on each resource block to each UE being served.

Uplink (UL) frames have a similar format but may have fewer subcarriers as uplink transmissions may use single carrier frequency division multiplexing (SC-FDMA). The uplink transmissions may also use OFDMA.

Figure 9A:
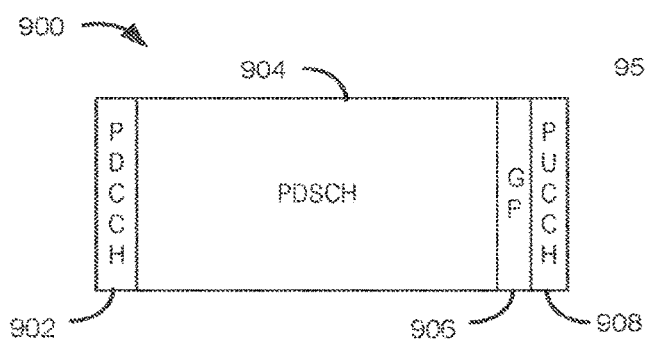
FIGS. 9A and 9B are data diagrams showing a self-contained time division duplex (TDD) downlink-uplink (DL-UL) slot structure according to some example embodiments.
Figure 9B:
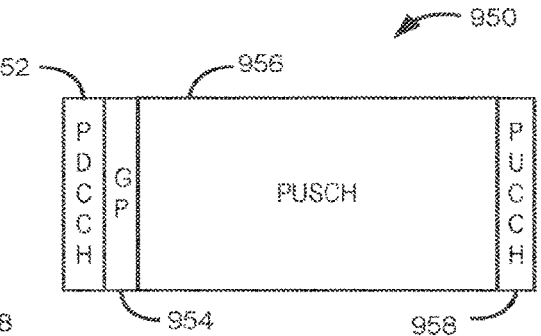

To enable low latency transmission for enhanced mobile broadband communication, a 5G system may employ a self-contained time-division duplex (TDD) slot structure that includes both downlink and uplink capabilities. FIGS. 9A and 9B illustrate examples of self-contained TDD slot structures including both downlink (DL) and uplink (UL) resource blocks in one slot. Slot structure 900 shown in FIG. 9A is a modification of a DL slot to include UL resources and slot structure 950, shown in FIG. 9B, is a modification of a UL slot to include DL resources. The slot 900 includes PDCCH resource blocks 902. PDSCH resource blocks 904 and PUCCH resource blocks 908. In order to accommodate the DL to UL and UL to DL switching time and round-trip propagation delay, a guard period (GP) 906 is inserted between PDSCH 904 and PUCCH 908. The modified UL slot 950, shown in FIG. 9B, includes PDCCH resource blocks 952, PUSCH resource blocks 956, and PUCCH resource blocks 958. A guard period 954 separates the PDCCH 952 from the PUSCH 956.

Although the described embodiments use DL-UL slots, other examples may use separate DL and UL slots.

In the some LTE systems, PUCCH may be transmitted in a frequency region near the limits of the system bandwidth. Further, PUCCH and PUSCH may be multiplexed using frequency division multiplexing (FDM). As shown in the examples of FIGS. 9A and 9B, however, the PUCCH and PDCCH are multiplexed using time division multiplexing (TDM).

The PUCCH and PUSCH resource blocks may be used to send uplink control information (UCI) from a UE 101 and/or 102 to a RAN node 111 and/or 112. The UCI may include scheduling request (SR), hybrid automatic repeat request-acknowledgement (HARQ-ACK)—including HARQ negative acknowledgement (HARQ-NACK)—feedback, and channel state information (CSI) reports, including, for example, channel quality indicators (CQIs), precoding matrix indicators (PMIs) and rank indicators (RIs). The UCI may also include beam related information such as beam state information (BSI) which may include beam index and beam reference signal received power (B-RSRP) measured from beam reference signal (BRS); and Beam refinement information (BRI) which may include beam index and B-RSRP measured from beam refinement reference signal (BRRS). Different PUCCH formats can be defined depending on the amount of UCI data to be sent.

Figure 10:
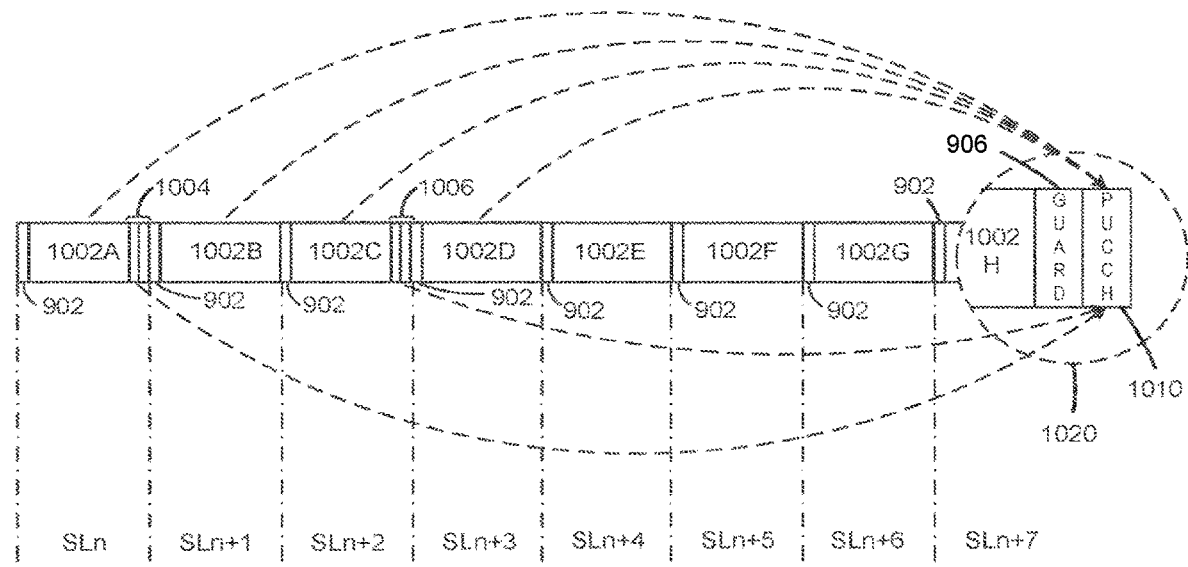
FIG. 10 is a data diagram showing an example use of self-contained TDD DL-UL subframes or slots according to some example embodiments.

FIG. 10 illustrates a structure in which the UE has been configured to send HARQ-ACK. CSI and BRI m a UL slot 10021H (SLn+7). As shown in FIG. 10, the UL data includes HARQ-ACK from four slots (1002A, 1002B, 1002C and 1002D) as well as a CSI report responsive to a CSI reference signal (CSI-RS) 1004 in slot Sim and BRI generated in response to a BRRS 1006 sent in SLn+2. The amount of CSI information to be sent may be larger than the maximum payload size supported by the PUCCH 1010 (shown, for clarity, m the magnified inset 1020). In the example the requested UCI is to be sent via each the PUCCH 1010 of slot 1002H (SLn+7). Slots 1002E, 1002F, and 1002G are also illustrated.

In this example, the CSI and BRI report timing may follow the HARQ-ACK feedback timing as indicated m the downlink control information (DCI). When that overall UCI data to be sent is larger than the maximum supported PUCCH payload (e g. 22 bits), some of the information cannot be carried by PUCCH 1010. Thus, some of the UCI data may be dropped (not sent).

The embodiments described below relate to simultaneous transmission of UCI in a one or more PUCCHs and/or PUSCHs of one or more DL-UL slots. The UCI may include one or more of HARQ-ACK, service requests (SRs), and CSI, BSI and/or BRI reports.

In one embodiment, UE may not expect the UCI payload size to exceed the maximum allowable payload size supported by PUCCH. In other words, gNB/eNB may guarantee that the total UCI payload size is not larger than the maximum allowable payload size of a particular PUCCH. In one example, when K slots may be bundled (e.g. K=4 for slots 1002A, 1002B. 1002C and 1002D in FIG. 10), the gNB/eNB may request the transmission of only one of the CSI report, BSI report or BR, report on PUCCH 1010.

In another embodiment, some of the UCI, i.e., CSI, BSI. BRI report. HARQ-ACK and/or SR may be dropped when the total UCI payload size exceeds the maximum allowable payload size supported by the PUCCH. Further, a rule for dropping UCI and/or an assignment of priority to determine which UCI is sent may be predefined or configured by the gNB/eNB through high layer signaling, for example via a 5G master information block (MIB), 5G system information block (SIB), media access control (MAC) control element (CE), or radio resource control (RRC) signaling.

In one example, HARQ-ACK feedback can be assigned the highest priority, followed, in order, by SR, BSI, BRI and CSI reports. Alternatively the rule for dropping UCI data may be determined based on the time at which the UCI is obtained. In one example, The HARQ-ACK can be defined with the highest priority and the SR can be defined with the second highest priority. For BSI. BRI and/or CSI reports, the most recently obtained one may have the highest priority. In another option, only the most recent report among the BSI. BRI and CSI reports may be sent regardless whether additional payload data may be accommodated by the PUCCH. The other two indicators may be considered out of date and may not be reported.

Figure 11A:
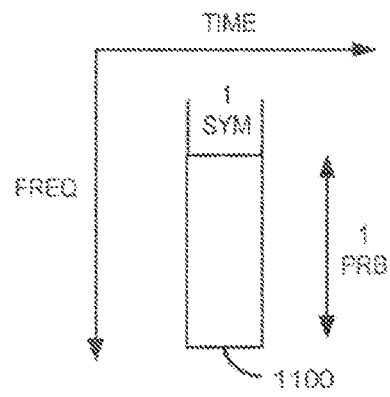
FIGS. 11A, 11B, 11C and 11D are data diagrams showing example uplink control information (UCI) payloads and physical uplink control channel (PUCCH) resources according to some example embodiments.
Figure 11C:
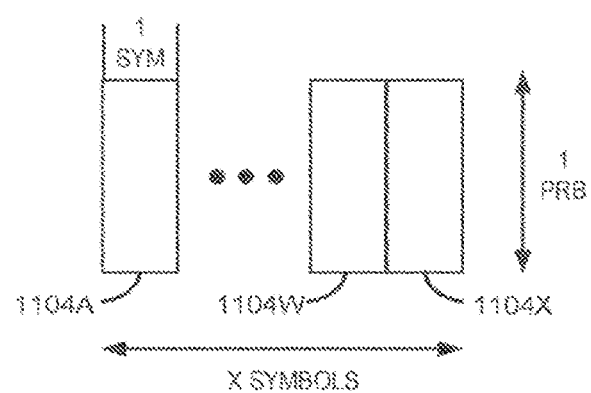
Figure 11B:
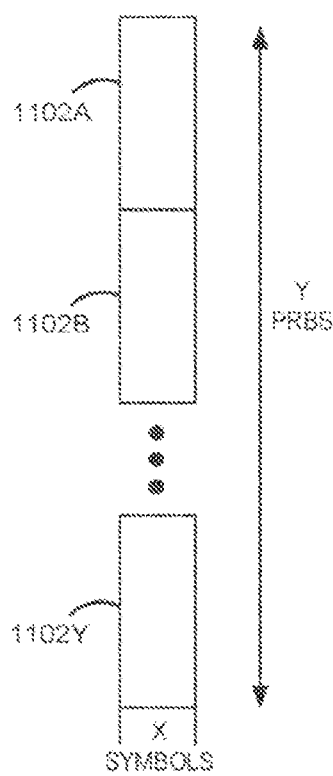
Figure 11D:
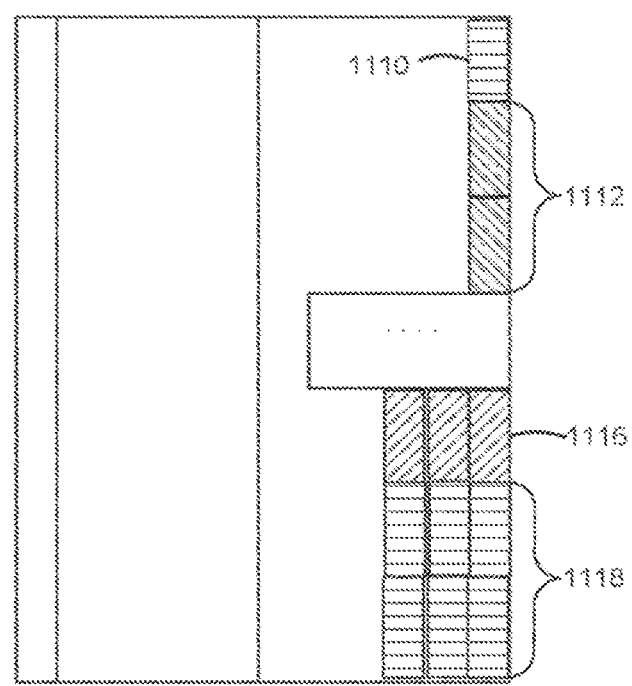

In another embodiment, the number of PUCCH resources in a particular DL slot may be configured by higher layer signaling (e.g. MIB, SIB, MAC CE, or RRC signaling) in order to support different UCI payload sizes in a slot. As an example of this embodiment, a UE may be configured with two sets of PUCCH resources that have different maximum supported payload size corresponding to one or multiple PUCCH formats. FIGS. 11A, 11B, 11C and 11D conceptually illustrate how different maximum UCI payload sizes may be configured for of different PUCCH resources. This resource allocation may be achieved by configuring the bandwidth of a PUCCH in terms of a number of 2o resource blocks assigned to the PUCCH resource. As shown, resource 1002 in FIG. 11A includes one physical resource block (PRB) which, as described above, may include one symbol defined by 12 orthogonal 15 KHz subcarriers. FIG. 11B shows a larger PUCCH resource including Y PRBs (1102A, 1102B . . . 1102Y), each PRB including X symbols (1104A, . . . 1104W, 1104X), as shown in FIG. 11C. Alternatively or additionally, as shown in FIG. 11D, different numbers of symbols in the time domain and/or the frequency domain may be independently configured for each PUCCH resource. For example, as shown in FIG. 11D, PUCCH resource 1110 including one PRB and PUCCH resource 1112 including two PRBs may be configured for a first UE (UE1) and PUCCH resources 1116 and 1118, including three PRBs and six PRBs respectively, may be configured for a second UE (UE2). In FIG. 1D. PUCCH resources 1110 and 1112 configured for UE1 may correspond to a single PUCCH format or different PUCCH formats having respectively different UCI capacities.

In one design, the gNB/eNB may select the PUCCH resource with a larger supportable payload size (e.g. PUCCH resource 1102A-1102Y, shown in FIG. 11B) when the total UCI payload exceeds a threshold; Otherwise, the gNB/eNB may select the PUCCH resource with smaller supportable payload size (e.g. PUCCH resource 1100). The threshold may be either fixed in the specification for the protocol or configured via higher layer signaling. Alternatively, when the gNB/eNB may select the PUCCH resource having the smallest UCI capacity that can accommodate the amount of UCI data for a given set of bundled slots to reduce the UI, control overhead.

In another design, the gNB/eNB may select the PUCCH resource to use based on a dynamic indicator information element (IE) in the detected DCI. Alternatively or in addition, dynamic indication of PUCCH resources for HARQ-ACK bits can be signaled using additional relative or explicit dynamic commands to select actual PUCCH resources from a set of implicitly/explicitly reserved PUCCH resources (e.g., semi-statically reserved PUCCH resources).

In another embodiment, independent report timing for CSI, BSI and/or BRI report(s) can be explicitly or implicitly indicated in the DCI format to stagger the PUCCH data across multiple DL-UL slots. In particular, the CSI, BSI and/or BRI reports may be transmitted in a different DL-UL slot from the DL-UL slot used for the HARQ-ACK feedback. This mechanism can allow the UCI payload size on each identified PUCCH to be less than the maximum allowable payload size supported by the PUCCH format.

In one example, a report may be timed using a timing field that has the same size as the HARQ feedback delay counter. The timing field may be explicitly included m the DCI format used to trigger a CSI or beam related (e.g. BRI and/or BSI) report. In particular, the CSI, BSI and/or BRI report(s) may be transmitted via PUCCH in DL-UL slot $n+k_{min}+k_{delay}$ in response to a DCI transmitted in slot n, where $k_{min}$ is the minimum HARQ processing delay. In this example, $k_{min}$ is predefined in the specification or configured by higher layer signaling according to the processing capability of the UE to which the DCI is sent. The value $k_{delay}$ is an additional reporting delay or offset value (delay index) indicated in the DCI format.

Table 1 illustrates one example of CSI/BSI/BRI report delay index. In this example, a two bit report delay index is defined for CSI/BSI/BRI report timing in the DCI format.

TABLE 1

| CSI/BSI/BRI report delay index | $k_{delay}$ (slot) |
| --- | --- |
| 0 | 3 |
| 1 | 2 |
| 2 | 1 |
| 3 | 0 |

In another example, a timing offset field for sending the CSI, BSI and/or BRI report(s) may be defined in the DCI format. This timing offset may be defined relative to the HARQ-ACK feedback timing. In this example, the CSI, BSI and/or BRI report(s) may be transmitted via PUCCH in DL-UL slot $n+k_{min}+k_{HARQ\_delay}+k_{offset}$ when the CSI-RS that triggers the CSI report is transmitted in slot n, where $k_{HARQ\_delay}$ is the HARQ feedback delay and $k_{offset}$ is the timing offset for CSI, BSI and/or BRI reporting relative to HARQ feedback delay.

Table 2 illustrates another example of a CSI. BSI and/or BRI report timing offset index that may be included in the DCI format. In this example, a two-bit report timing offset index may be defined for CSI. BSI and/or BRI report timing.

TABLE 2

| CSI, BSI and/or BRI report offset index | $K_{offset}$ (slot) |
| --- | --- |
| 0 | −1 |
| 1 | 0 |
| 2 | 1 |
| 3 | 2 |

Alternatively, a fixed report timing for CSI, BSI and/or BRI reporting can be predefined in the protocol specification or configured by higher layer signaling, for example via MIB. SIB. MAC CE, or RRC signaling. For example, the CSI, BSI and/or BRI report timing may be configured by UE specific RRC signaling from the gNB/eNB in accordance with the capabilities of each UE. It is contemplated that this report timing may be defined independently of the HARQ-ACK feedback timing as indicated in the DCI message.

In one design, the xPUCCH resource with a larger supportable payload size (e.g. xPUCCH resource 302) may be selected for the UCI transmission in case of the total number of UCI payload exceeds a threshold; Otherwise, UE may select the xPUCCH resource with smaller supportable payload size (e.g. xPUCCH resource 300). The said threshold may be either fixed in specification or configured by higher layers. Alternatively, the xPUCCH resource with smallest UCI capacity but still can accomodate the total bits number of all UCIs may be selected to minimize the UL control overhead.

In another design, the UE may select xPUCCH resource to use based on dynamic indicator IE in the detected DCI formats. In addition, dynamic indication of xPUCCH resource for HARQ-ACK bits can be done by using additional relative or explicit dynamic indication to select actual PUCCH resources out of the set of implicit/explicitly reserved (e.g., semi-statically reserved) resources.

Figure 12:
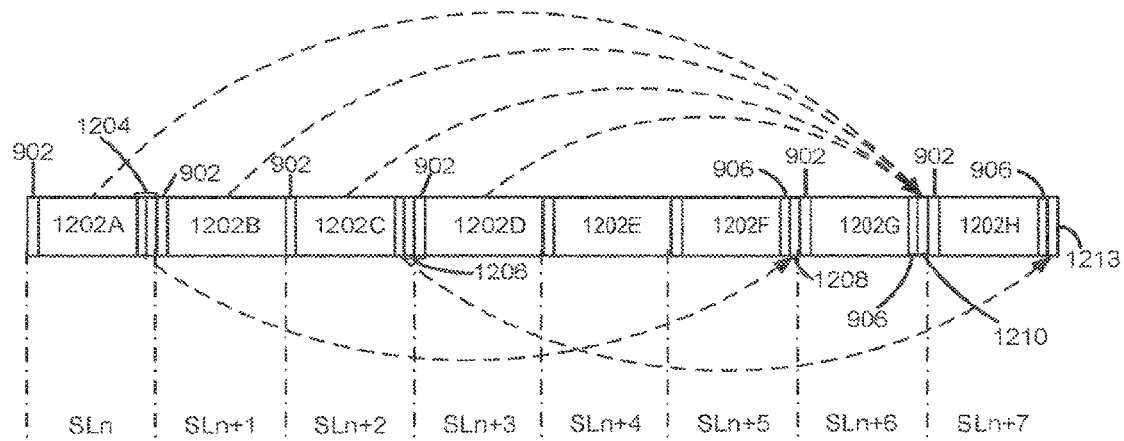
FIGS. 12, 13, and 14 are data diagrams showing example uses and structures of self-contained TDD subframes or slots according to some example embodiments.

FIG. 12 illustrates an example of different report timings for CSI and BRI and HARQ-ACK feedback. In particular in response to the CSI-RS 1204 received in slot 1202A, the CSI report, is transmitted via PUCCH 1208 in DL-UL slot 1202E (SLn+5); HARQ-ACK feedback is transmitted via PUCCH 1210 in DL-UL slot 1202G (SLn+6) and, the BRI report is transmitted via PUCCH 1213 in DL-UL slot 1202H (SLn+7) in response to the BRRS 1206 received in slot 1202C. Given that the size of each report is less than the maximum allowable payload size supported by the PUCCH format, collision among UCI reports or dropping of one or more UCI reports may be avoided. Slots 1202B, 1202D, 1202E. and 1202F are also illustrated.

In another embodiment, the CSI and/or beam related information reports can be transmitted in the same DL-UL slot as HARQ-ACK feedback. Further, the CSI and/or beam related information reports may be transmitted in the same OFDM symbol as the HARQ-ACK feedback or in different symbols from the HARQ-ACK feedback. Thus scheme may help to resolve an issue when UE fails to detect one DCI within a group of bundled slots.

In one option, a field for the symbol index, l, for the transmission of UCI via PUCCH may be indicated in the DCI format. Table 3 illustrates one example of PUCCH symbol index field. This one bit field can be used to indicate whether CSI, BSI and/or BRI report(s) are transmitted in the last or second to last symbol in one DL-UL slot. Note that in this option, HARQ-ACK feedback can be transmitted in the last OFDM symbol of the DL-UL slot.

TABLE 3

| PUCCH symbol index field | Symbol index (l) |
| --- | --- |
| 0 | 12 |
| 1 | 13 |

When the CSI, BSI and/or BRI report(s) are transmitted within the same OFDM symbol as the HARQ-ACK report, the frequency domain index of the CSI, BSI and/or BRI report(s) can be associated with the frequency domain index of HARQ-ACK. The specific frequency domain index offset can be predefined, configured by high layer signaling, or indicated in the DCI format.

In another option, the symbol index for the transmission of UCI can be predefined In one example, the CSI report may be transmitted in OFDM symbol 11, the BSI and/or BRI report may be transmitted in OFDM symbol 12 and the HARQ-ACK feedback may be transmitted in OFDM symbol 13. In this embodiment, multiplexing of different elements of the UCI into one PUCCH may be avoided.

Figure 13:
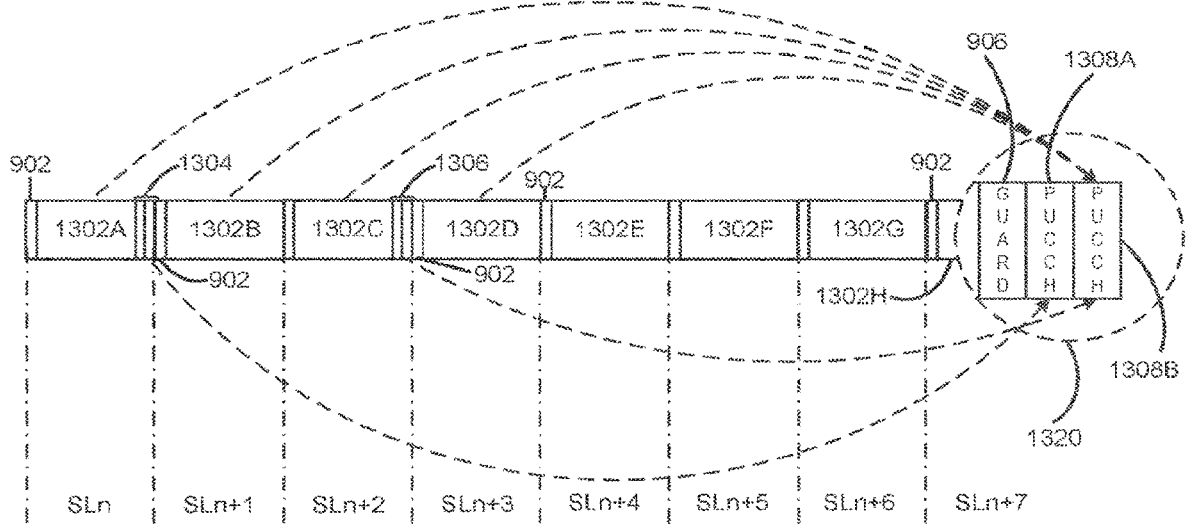

FIG. 13 illustrates another example report timing for CSI, BRI and HARQ-ACK feedback. In this example, as shown in the magnified insert 1320, the CSI and/or BRI report and HARQ-ACK feedback are transmitted in the same DL-UL slot, i.e. DL-UL slot 1302H (SLn+7). The CSI report, in response to the CSI-RS 1304 received in slot 1302A, is transmitted via a PUCCH in the second to last OFDM symbol 1308A of the DL-UL slot 1302H. The HARQ-ACK feedback is for slots 1302A, 1302B, 1302C and 1302D. This feedback is combined with the BSI and/or BRI, resulting from the BSER 1306 received in slot 1302, and the combined UCI is transmitted via the last OFDM symbol 1308B. Slots 1302E, 1302F, and 1302G are also illustrated.

Figure 14:
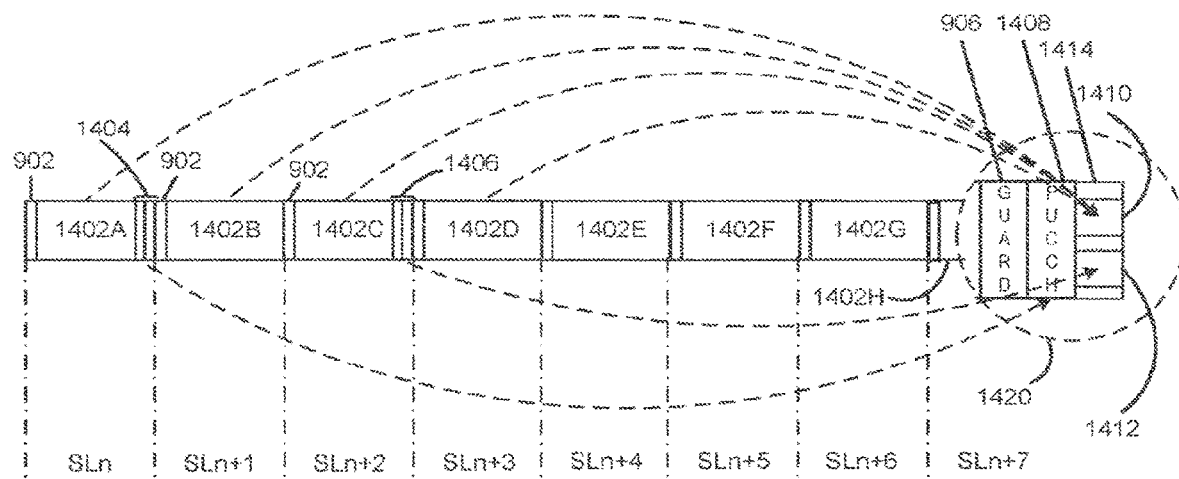

In another embodiment, different UCI elements may be transmitted in separate resources in one DL-UL slot. In particular, in two UCA elements may be transmitted in the same OFDM symbol when they are transmitted in two different PUCCH resources of the symbol. FIG. 14 illustrates another example report timing for sending CSI, BSI and HARQ-ACK feedback in this example the combined CSI and BSI report, generated in response to a CSI-RS 1404 of slot 1402A and the 1:3,RRS 1406 of slot 1402C as well as the HARQ-ACK feedback for the slots 1402A, 1402B, 1402C, and 1402D are transmitted in the same DL-UL slot 1402H (i.e. SLn+7). In this example, as shown in the magnified insert 1420, the CSI report is transmitted via the PUCCH in the second to last OFDM symbol 1408 while the HARQ-ACK feedback and the BRI report are transmitted in two different PUCCH resources 1410 and 1412, respectively, in the last OFDM symbol 1414 of the DL-UL slot 1402H. Slots 1402E, 1402F, and 1402E are also illustrated.

In yet another embodiment, when PUCCH for enhanced coverage mode is triggered to carry UCI reports, multiple UCI reports can be multiplexed together in one DL-UL slot. In this example, the UCI including CSI, BSI and/or BRI report(s) may use the same transmission timing as HARQ-ACK feedback. It is noted that PUCCH for enhanced coverage mode may span the entire DL-UL slot except for the PDCCH 952 and the guard period 954 at the beginning of the slot, as shown in FIG. 9B. Consequently, the maximum allowable payload size supported by PUCCH in a combined DL-UL slot can be relatively large.

Figure 15:
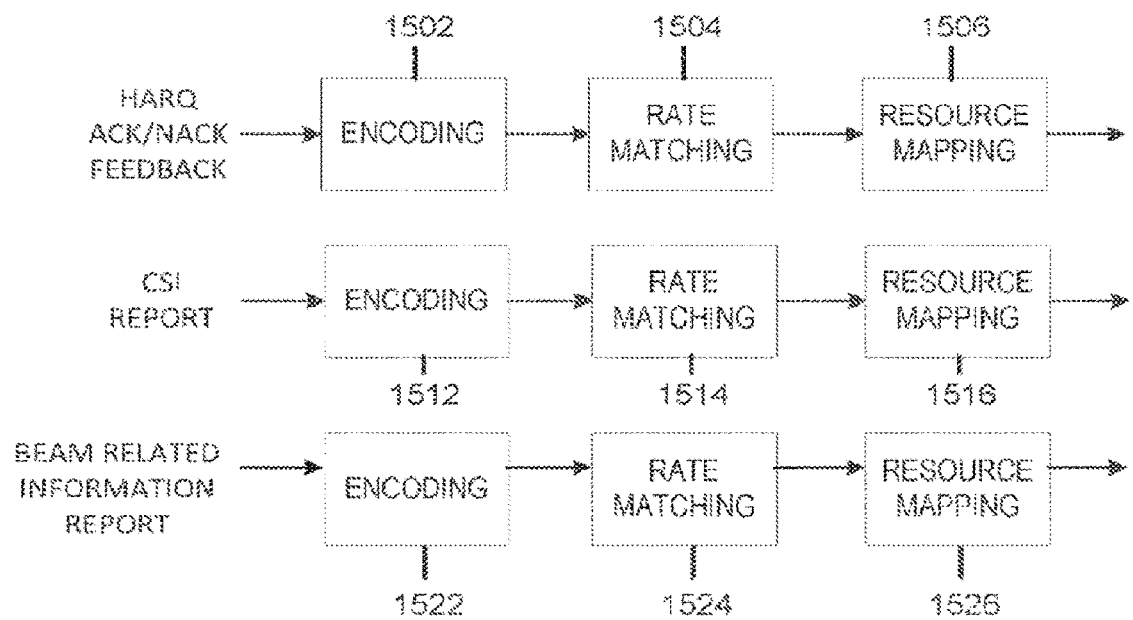
FIG. 15 is a block diagram showing example independent UCI coding elements according to some example embodiments.

FIG. 15 illustrates the independent encoding, rate matching, and resource mapping circuitry for different UCI elements. Using independent encoding, rate matching and resource mapping may help to resolve an ambiguity issue when the UE fails to detect one of DCIs used to trigger the CSI, BSI and/or BRI report(s). In this case, the gNB/eNB may still decode other UCI elements from their corresponding resources. As shown in FIG. 15, each of the HARQ-ACK feedback. CSI report and BSI/BRI reports has its own coding path. The path for the HARQ-ACK feedback includes an encoding block 1502, a rate matching block 1504 and a resource mapping block 1506. The path for the CSI report includes an encoding block 1512, a rate matching block 1514 and a resource mapping block 1516 and the path for the BSI/BRI report(s) includes an encoding block 1522, a rate matching block 1524 and a resource mapping block 1526. For each of these paths, the encoding block collects and encodes the information into encoded bits. The rate matching block organizes the encoded bits based on the resources allocated for each part of the encoded data. The resource mapping blocks map the encoded and rate matched data into the resources allocated m the PUCCH or, as described below, the PUSCH of a slot.

Figure 16:
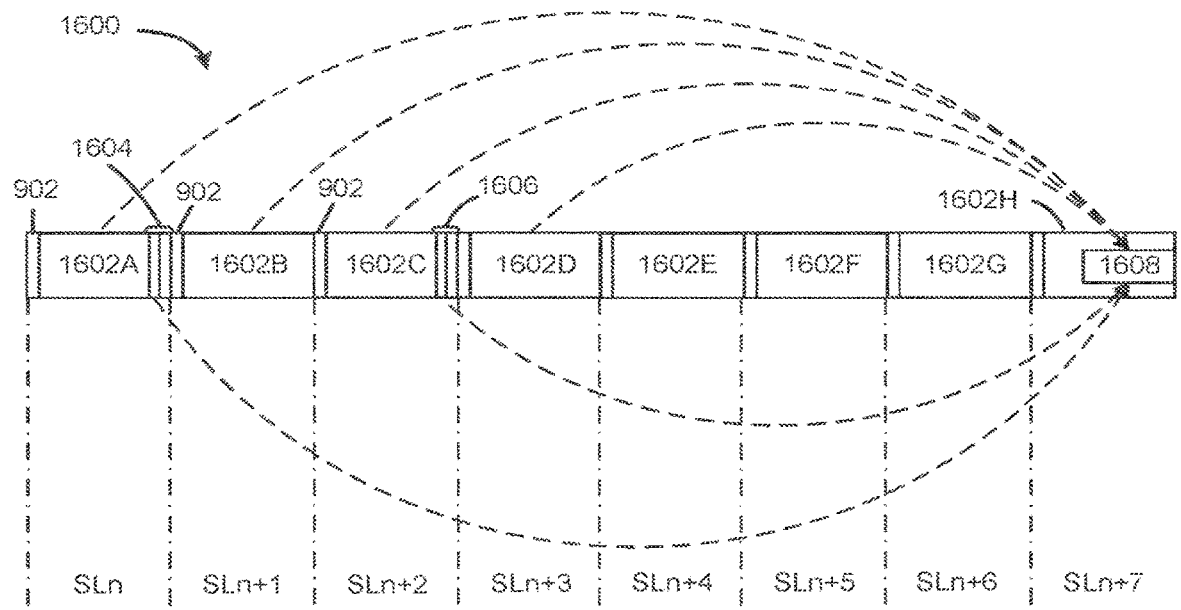
FIG. 16 is a data diagram showing an example UCI format using PUCCH resources in a TDD subframes or slots with enhanced coverage mode.

FIG. 16 illustrates one example slot sequence 1600 for sending UCI elements via PUCCH in enhanced coverage mode. In this example, all UCI elements including the CSI BSI, and/or BRI report(s) generated m response to the (CSI-RS 1604 in slot 1602A and the BRRS 1606 in slot 16020, as well as the HARQ-ACK feedback for the slots 1602A, 1602B, 1602C and 1602D may be sent via PUCCH 1608 for enhanced coverage mode in DL-UL slot 1602H (SLn+7). Slots 1602E, 1602F, and 1602G are also illustrated.

Although these embodiments are described separately, various schemes described above can be applied to transmit the different UCI elements either alone or in combination in different DL-UL slots, UL only slots, in different symbols of a slot and/or in different resources of a symbol within a slot.

Furthermore, although the examples described above use the PUCCH to send the UCI elements, it is contemplated that the gNB/eNB may trigger the PUSCH of a DL-UL slot to carry UCI. This PUSCH, may be, for example, the PUSCH 956, shown in FIG. 9B. In this example, the UCI elements may or may not be multiplexed with the shared data sent via the PUSCH. To allow the PUSCH to carry HARQ-ACK feedback information, one field m DCI for uplink grant may be used to trigger HARQ-ACK feedback for DL transmission. Table 4 illustrates one example of HARQ-ACK triggering index in the DCI for uplink grant assuming the number of DL, HARQ processes is 8.

TABLE 4

| HARQ-ACK triggering index | DL HARQ-ACK report |
|---|---|
| 0 | No DL HARQ-ACK report |
| 1 | HARQ-ACK report for HARQ process ID#0-1 |
| 2 | HARQ-ACK report for HARQ process ID#0-3 |
| 3 | HARQ-ACK report for HARQ process ID#0-7 |

According to another embodiment, the HARQ-ACK feedback triggering mechanism may be designed to support HARQ-ACK feedback for multiple component carriers (CCs) when a UE is configured to receive and/or send data via multiple CCs, for example, using carrier aggregation. By way of non-limiting example, the association between a value of HARQ-ACK triggering field and a combination of <One set of serving cells, one set of HARQ process IDs (HPIs)> may be specified in a DCI field. An example coding of a two-bit DCI field is illustrated in Table 5 below.

TABLE 5

| Value of HARQ-ACK triggering field | Description |
|---|---|
| 0 | No DL HARQ-ACK report |
| 1 | HARQ-ACK for serving cell c and $1^{st}$ set of HARQ process IDs |
| 2 | HARQ-ACK for <$1^{st}$ set of serving cells, a $2^{nd}$ set of HARQ process IDs> |
| 3 | HARQ-ACK for <$1^{st}$ set of serving cells, a $3^{rd}$ set of HARQ process IDs> |

Figure 17:
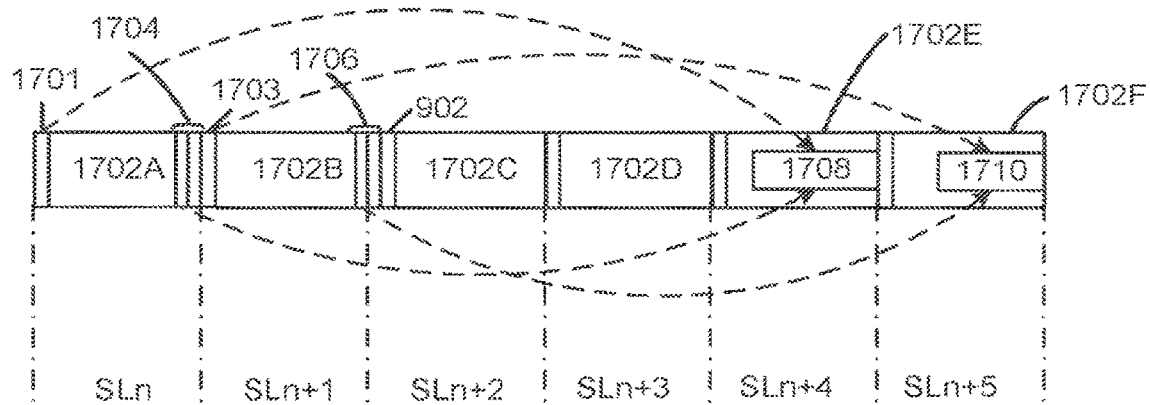
FIG. 17 is a data diagram showing an example UCI format using a physical uplink shared channel (PUSCH) resources in a TDD subframe or slot.

In this example, the DCI format including the HARQ-ACK triggering field may be transmitted by serving cell c. FIG. 17 illustrates one example of sending UCI elements via PUSCH. In this example, the DCI for uplink grant 1701 received in slot 1702A. (SLn). The uplink grant has a HARQ-ACK triggering index of 0 and CSI triggering is enabled by the DCI for uplink grant 1703 in slot 1702A. In this example, the PUSCH 1708 in DL-UL slot 1702E (SLn+4), carries only the CSI report. For the uplink grant 1703 in slot 1702B (SLn+1), the HARQ-ACK triggering index is 2 and the BRRS triggering is enabled by the BRRS 1706 in slot 1702B. In this instance, both the BRI report and the HARQ-ACK feedback for DL HARQ process ID #0-3 are combined and carried in PLSCH 1710 in DL-UL slot 1702F (SLn+5). Slots 1702C and 1702D are also illustrated.

Although the examples above describe sending the HARQ-ACK feedback and the other UCI via physical layer resources (PUCCH and PUSCH), it is contemplated that this information may alternatively be sent in a Media Access Control (MAC) control element (CE). Due to the nature of this information, such a MAC CE may have a higher priority than other MAC CEs. In one embodiment an indicator can be added to the uplink grant to configure the reporting scheme for the HARQ-ACK and the UCI. In this instance, the gNB/eNB may explicitly configure HARQ-ACK and/or the UCI report(s) as a MAC CE.

EXAMPLES

Example 1 may include an apparatus of user equipment (UE) comprising; an interface; and processing circuitry, coupled to the interface and configured to: generate uplink control information (UCI) including hybrid automatic repeat request acknowledgement (HARQ-ACK) feedback and other UCI data including at least one of a channel state information (CSI) report, a beam state information (BSI) report, a beam refinement information (BRI) report in response to at least one trigger; format the UCI by either adjusting an amount of UCI data to be sent to conform a payload size of UL resources indicated by the at least one trigger or by using sending the HI-ARQ-ACK data and the other UCI data using separate UL resources, responsive to the at least one trigger; and encode the formatted UCI in the UL resource for transmission.

Example 2 may include the apparatus of example 1 or any other example herein, wherein the processor is further configured to, adjust the amount of UCI data to be sent by selectively dropping elements of the UCI when the encoded UCI has a size greater than the payload size.

Example 3 may include the apparatus of example 2 or any other example herein, wherein: the processor is further configured to selectively drop the elements according to a transmission priority received from a next generation Node B (gNB) or enhanced Node B (eNB) via one of a master information block (MIB), system information block (SIB), media access controller control element (MAC CE), or radio resource configuration (RRC) signaling:

Example 4 may include the apparatus of example 1 or any other example herein, wherein: the UL resources include a plurality of physical uplink control channel (PUCCH) resources; and the processor is further configured to decode configuration data, the configuration data configuring the UE to support different payload sizes using the plurality of PUCCH resources.

Example 5 may include the apparatus of example 1 or any other example herein, wherein, the processor is further configured to, decode downlink control information (DCI) including timing information for independent timing of the UCI indicating a first UL resource for sending the HARQ-ACK feedback and a second UL resource, different from the first UL resource, for sending at least one of the CSI, BSI or BRI report; and to encode the HARQ-ACK feedback for transmission in a physical uplink control channel (PUCCH) of the first UL resource and to encode the at least one of the CSI, BSI or BSI report for transmission in a PUCCH of the second UL resource.

Example 6 may include the apparatus of example 5 or any other example herein, wherein: the report timing information further includes a delay value $k_{delay}$ for triggering at least one of a CSI report, a BSI report, or a BRI report; and the processor is further configured to encode the HARQ-ACK in the first UL resource of a slot having an index $n+k_{min}$ and to encode the at least one of the CSI report, BSI report, or BRI report in a PUCCH of the second UL resource of a slot having an index $n-k_{min}+k_{delay}$, where n is an index of a slot in which the report was triggered, $k_{min}$ is a number of slots corresponding to a minimum HARQ processing delay, and $k_{delay}$ is a number of slots corresponding to an additional reporting delay or offset value indicated in the DCI format.

Example 7 may include the apparatus of example 5 or any other example herein, wherein: the report timing information further includes a timing offset field, $k_{offset}$, indicating a number of slots by which the at least one of the CSI, BSI or BRI report is delayed a relative to a slot indicated by n, $k_{min}+k_{HARQ\_delay}$, where n is an index of a slot in which the report was triggered, $k_{min}$ is a minimum HARQ processing delay and $k_{HARQ\_delay}$ is a HARQ feedback delay; and the processor is configured to encode the HARQ feedback in the first UL resource of a slot having an index $n+k_{min}+k_{HARQ\_delay}$ and to encode the at least one of the CSI, BSI or BRI report in the second UL resource of a slot having an index $n+k_{min}+k_{HARQ\_delay}+k_{offset}$.

Example 8 may include the apparatus of example 5 or any other example herein, wherein the processor is configured to decode a fixed report timing for the at least one of the CSI, BSI or BRI report in at least one of a master information block (MIB), system information block (SIB), media access controller control element (MAC CE) or radio resource control (RRC) signaling.

Example 9 may include the apparatus of example 1 or any other example herein, wherein: the processor is configured to encode the at least one of the CSI. BSI or BRI report in a first symbol of a physical uplink control channel (PUCCH) of one UL resource and to encode and the HARQ-ACK feedback in a second symbol of the PUCCH of the one UL resource.

Example 10 may include the apparatus of example 9 or any other example herein, wherein the first and second symbols are a single symbol.

Example 11 may include the apparatus of example 10 or any other example herein, wherein the processor is configured to encode the at least one of the CSI. BSI or BRI report in a first resource of the single symbol and to encode the HARQ-ACK feedback in a second resource of the single symbol.

Example 12 may include the apparatus of example 10 or any other example herein, wherein the first symbol corresponds to a predefined symbol index of a PUCCH in the one UL resource.

Example 13 may include the apparatus of example 9 or any other example herein, wherein the first and second symbols are different symbols.

Example 14 may include the apparatus of example 1 or any other example herein, wherein: the UCI includes multiple UCI elements; the UL resource includes a physical uplink control channel (PUCCH) with enhanced coverage mode; and the processor is configured to format the multiple UCI elements for transmission in the PUCCH with enhanced coverage mode.

Example 15 may include the apparatus of example 9 or any other example herein, wherein: the processor is configured to: separately format the UCI for each of the CSI report, the beam related information report and the HARQ-ACK feedback; and separately map each of the CSI report, the beam related information report and the HARQ-ACK feedback onto the UL resource.

Example 16 may include the apparatus of example 1 or any other example herein, wherein each UL resource is a UL resource of a downlink-uplink (DL-UL) slot.

Example 17 may include an apparatus of a next generation Node B (gNB) or an enhanced Node B (eNB) comprising: an interface; and processing circuitry, coupled to the interface and configured to: transmit an indication including a request for uplink control information (UCI) to user equipment (UE), the UCI including hybrid automatic repeat request acknowledgement (HARQ-ACK) feedback and other UCI data including at least one of a channel state information (CSI) report, a beam state information (BSI) report, a beam refinement information (BRI) report, and the request indicating one or more UL resources to be used for the UCI; decode the one or more UL resources; and extract at least a portion of the requested UCI from the one or more UL resources.

Example 18 may include the apparatus of example 17 or any other example herein, wherein the indication specifies a first UL resource for the HARQ-ACK feedback and a second UL resource, different from the first UL resource for the at least one of the CSI report, BSI report or BRI report.

Example 19 may include the apparatus of example 17 or any other example herein, wherein at least one of the first and second UL resources is a UL resource of a downlink-uplink (DL-UL) slot.

Example 20 may include a non-transitory computer readable medium including program instructions that, when executed by a processor of a UE configure the processor to: decode a trigger requesting UCI elements including at least one of hybrid automatic repeat request-acknowledgement (HARQ-ACK) feedback, a scheduling request (SR), a channel state information (CSI) report and a beam related information report, the trigger including an indication of one or more UL resources to be used to send the requested UCI elements, the one or more UL resources including at least one of a physical uplink control channel (PUCCH) or a physical uplink shared channel (PUSCH); generate the requested UCI elements; and encode the generated UCI elements for transmission via the indicated one or more UL resources.

Example 21 may include the non-transitory computer readable medium of example 20 or any other example herein, wherein the program instructions further configure the processor to, selectively drop elements of the UCI when the encoded UCI has a size greater than a payload size of the indicated one or more UL resources.

Example 22 may include the non-transitory computer readable medium of example 21 or any other example herein, wherein the program instructions further configure the processor to selectively drop the elements of the UCI according to a transmission priority received from a network node via one of a master information, block (MIB), system information block (SIB), media access controller control element (MAC CE), or radio resource configuration (RRC) signaling.

Example 23 may include the non-transitory computer readable medium of example 20 or any other example herein, wherein: the processor is further configured to, decode the indication including downlink control information (DCI) having timing information indicating a first UL resource for sending the HARQ-ACK feedback and a second UL resource, different from the first UL resource, for sending at least one of the CSI. BSI or BRI report, and encode the HARQ-ACK feedback for transmission in the first UL resource and to encode the at least one of the CSI. BSI or BSI report for transmission in the second UL resource.

Example 24 may include the non-transitory computer readable medium of example 23 or any other example herein, wherein: the report timing information further includes a delay value $k_{delay}$ for triggering at least one of a CSI report, a BSI report, or a BRI report; and the program instructions further configure the processor to encode the HARQ-ACK in the first UL resource of a physical uplink control channel (PUCCH) of a first slot having an index $n+k_{min}$ and to encode the at least one of the CSI report, BSI report, or BRI report in a PUCCH of a second slot having an index $n+k_{min}+k_{delay}$, where n is an index of a trigger slot in which the report was triggered, $k_{min}$ is a number of slots corresponding to a minimum HARQ processing delay, and $k_{delay}$, is a number of slots corresponding to an additional reporting delay or offset value indicated in the DCI format.

Example 25 may include the non-transitory computer readable medium of example 23 or any other example herein, wherein: the report timing information further includes a timing offset field, $k_{offset}$, indicating a number of slots by which the at least one of the CSI, BSI or BRI report is delayed a relative to a slot indicated by $n+k_{min}+k_{HARQ\_delay}$, where n is an index of a trigger slot in which the report was triggered, $k_{min}$ is a minimum HARQ processing delay and $k_{HARQ\_delay}$ is a HARQ feedback delay; and the program instructions further configure the processor to encode the HARQ feedback in the first UL resource of a first slot having an index $n+k_{min}+k_{HARQ\_delay}$ and to encode the at least one of the CSI. BSI or BRI report in a second slot having an index $n+k_{min}+k_{HARQ\_delay}+k_{offset}$.

Example 26 may include an apparatus of a UE comprising: means for receiving a trigger requesting UCI elements including at least one of hybrid automatic repeat request-acknowledgement (HARQ-ACK) feedback, a scheduling request (SR), a channel state information (CSI) report and a beam related information report, the trigger including an indication of one or more UL resources to be used to send the requested UCI elements, the one or more UL resources including at least one of a physical uplink control channel (PUCCH) or a physical uplink shared channel (PUSCH); means for generating the requested UCI elements; and means for encoding the generated UCI elements for transmission via the indicated one or more UL resources.

Example 27 may include the apparatus of example 26 or any other example herein, further comprising means for selectively dropping elements of the UCI when the encoded UCI has a size greater than a payload size of the indicated one or more UL resources.

Example 28 may include the apparatus of example 26 or any other example herein, further comprising: means for selectively dropping the elements of the UCI according to a transmission priority; and means for receiving the transmission priority from a network node via one of a master information block (MIB), system information block (SIB), media access controller control element (MAC CE), or radio resource configuration (RRC) signaling.

Example 29 may include the apparatus of example 26 or any other example herein, further comprising means for receiving the indication including downlink control information (DCI) having timing information indicating a first UL resource to be used to send the HARQ-ACK feedback and a second UL resource, different from the first UL resource, for sending at least one of the CSI, BSI or BRI report; and means for encoding the HARQ-ACK feedback for transmission in the first UL resource and to encode the at least one of the CSI, BSI or BSI report for transmission in the second UL resource.

Example 30 may include the apparatus of example 29 or any other example herein, wherein: the report timing information further includes a delay value $k_{delay}$ for triggering at least one of a CSI report, a BSI report, or a BRI report; and the apparatus further includes means for encoding the HARQ-ACK in the first UL resource of a physical uplink control channel (PUCCH) of a first slot having an index $n+k_{min}$ and means for encoding the at least one of the CSI report. BSI report, or BRI report in a PUCCH of a second slot having an index $n+k_{min}+k_{delay}$, where n is an index of a trigger slot in which the report was triggered, $k_{min}$ is a number of slots corresponding to a minimum HARQ processing delay, and $k_{delay}$ is a number of slots corresponding to an additional reporting delay or offset value indicated in the DCI format.

Example 31 may include the apparatus of example 29 or any other example herein, wherein: the report timing information further includes a timing offset field, $k_{offset}$, indicating a number of slots by which the at least one of the CSI, BSI or BRI report is delayed a relative to a slot indicated by $n+k_{min}+k_{HARQ\_delay}$, where n is an index of a trigger slot in which the report was triggered, $k_{min}$ is a minimum HARQ processing delay and $k_{HARQ\_delay}$ is a HARQ feedback delay; and the apparatus further comprises means for encoding the HARQ feedback in the first UL resource of a first slot having an index $n+k_{min}+k_{HARQ\_delay}$ and means for encoding the at least one of the CSI, BSI or BRI report m a second slot having an index $n+k_{min}+k_{HARQ\_delay}+k_{offset}$.

The invention claimed is:

1. An apparatus, comprising:
a processor configured to cause a user equipment (UE) to:
generate a first amount of uplink (UL) control information (UCI) data including hybrid automatic repeat request acknowledgement (HARQ-ACK) feedback and other UCI data including a plurality of reports comprising at least one of a channel state information (CSI) report, a beam state information (BSI) report, or a beam refinement information (BRI) report in response to at least one trigger;
format the UCI by adjusting an amount of UCI data to be sent to conform to a payload size of physical uplink control channel (PUCCH) resources, wherein the PUCCH resources are selected, based on the first amount of UCI data, from a plurality of PUCCH resources, wherein respective PUCCH resources of the plurality of PUCCH resources include respective numbers of OFDM symbols and a first respective number of OFDM symbols of first respective PUCCH resources associated with a first respective time and frequency is different from a second respective number of OFDM symbols of second respective PUCCH resources associated with a second respective time and frequency, wherein adjusting the amount of UCI data to be sent comprises dropping a first report but not a second report in the UCI based on respective priorities when a total UCI payload size exceeds a maximum allowable payload size supported by a PUCCH format associated with the PUCCH resources; and
transmit the formatted UCI in the PUCCH resources.

2. The apparatus of claim 1, wherein: the respective priorities are determined according to a transmission priority received from a base station via one of a master information block (MIB), system information block (SIB), media access controller control element (MAC CE), or radio resource configuration (RRC) signaling.

3. The apparatus of claim 1, wherein: the processor is further configured to cause the UE to decode configuration data, the configuration data indicating the PUCCH resources.

4. The apparatus of claim 1, wherein: the processor is further configured to: decode downlink control information (DCI) including timing information for independent timing of the UCI indicating a first UL resource for sending the HARQ ACK feedback and a second UL resource, different from the first UL resource, for sending at least one of the CSI, BSI or BRI report; and to encode the HARQ-ACK feedback for transmission in a PUCCH of the first UL resource and to encode the at least one of the CSI, BSI or BSI report for transmission in a PUCCH of the second UL resource.

5. The apparatus of claim 4, wherein: the timing information further includes a delay value $k_{delay}$ for triggering at least one of a CSI report, a BSI report, or a BRI report; and the processor is further configured to cause the UE to encode the HARQ-ACK in the first UL resource of a slot having an index $n+k_{min}$ and to encode the at least one of the CSI report, BSI report, or BRI report in a PUCCH of the second UL resource of a slot having an index $n+k_{min}+k_{delay}$, where n is an index of a slot in which the report was triggered, $k_{min}$ is a number of slots corresponding to a minimum HARQ processing delay, and $k_{delay}$ is a number of slots corresponding to an additional reporting delay or offset value indicated in the DCI.

6. The apparatus of claim 4, wherein: the timing information further includes a timing offset field, $k_{offset}$, indicating a number of slots by which the at least one of the CSI, BSI or BRI report is delayed a relative to a slot indicated by $n+k_{min}+k_{HARQ\_delay}$ where n is an index of a slot in which the report was triggered, $k_{min}$ is a minimum HARQ processing delay and $k_{HARQ\_delay}$ is a HARQ feedback delay; and
the processor is configured to encode the HARQ feedback in the first UL resource of a slot having an index $n+k_{min}+k_{HARQ\_delay}$ and to encode the at least one of the CSI, BSI or BRI report in the second UL resource of a slot having an index $n+k_{min}+k_{HARQ\_delay}+k_{offset}$.

7. The apparatus of claim 4, wherein the processor is further configured to cause the UE to decode a fixed report timing for the at least one of the CSI, BSI or BRI report in at least one of a master information block (MIB), system information block (SIB), media access controller control element (MAC CE) or radio resource control (RRC) signaling.

8. The apparatus of claim 1, wherein: the processor is further configured to cause the UE to encode the at least one of the CSI, BSI or BRI report in a first symbol of the PUCCH resources and to encode the HARQ-ACK feedback in a second symbol of the PUCCH resources.

9. The apparatus of claim 8, wherein the first and second symbols are a single symbol.

10. The apparatus of claim 9, wherein the processor is further configured to encode the at least one of the CSI, BSI or BRI report in a first resource of the single symbol and to encode the HARQ-ACK feedback in a second resource of the single symbol.

11. The apparatus of claim 8, wherein the first symbol corresponds to a predefined symbol index of the PUCCH resources.

12. The apparatus of claim 8, wherein the first and second symbols are different symbols.

13. The apparatus of claim 1, wherein: the UCI includes multiple UCI elements; and the processor is further configured to format the multiple UCI elements for transmission in the PUCCH resources with enhanced coverage mode.

14. The apparatus of claim 1, wherein: the processor is further configured to: separately format the UCI for each of the CSI report, the BRI report and the HARQ-ACK feedback; and separately map each of the CSI report, the BRI report and the HARQ-ACK feedback onto a UL resource.

15. The apparatus of claim 1, wherein the PUCCH resources comprise a UL resource of a downlink-uplink (DL-UL) slot.

16. An apparatus, comprising:
a processor configured to cause a base station to:
transmit an indication including a request for uplink control information (UCI) to a user equipment (UE), the UCI including hybrid automatic repeat request acknowledgement (HARQACK) feedback and other UCI data including a plurality of reports comprising at least one of a channel state information (CSI) report, a beam state information (BSI) report, a beam refinement information (BRI) report, and the request indicating a plurality of physical uplink control channel (PUCCH)

resources to be used for the UCI based on an amount of UCI data, wherein respective PUCCH resources of the plurality of PUCCH resources include respective numbers of OFDM symbols and a first respective number of OFDM symbols of first respective PUCCH resources associated with a first respective time and frequency is different from a second respective number of OFDM symbols of second respective PUCCH resources associated with a second respective time and frequency; and receive, from the UE, at least a portion of the requested UCI PUCCH resources.

17. The apparatus of claim 16, wherein the indication specifies a first PUCCH resource for the HARQ-ACK feedback and a second PUCCH resource, different from the first PUCCH resource for the at least one of the CSI report, BSI report or BRI report.

18. The apparatus of claim 17, wherein at least one of the first and second PUCCH resources is a resource of a downlink-uplink (DL-UL) slot.

19. A user equipment (UE), comprising:
a radio; and
a processor operably connected to the radio and configured to cause the UE to:
generate a first amount of uplink (UL) control information (UCI) data including hybrid automatic repeat request acknowledgement (HARQ-ACK) feedback and other UCI data including a plurality of reports comprising at least one of a channel state information (CSI) report, a beam state information (BSI) report, or a beam refinement information (BRI) report in response to at least one trigger;
format the UCI by adjusting an amount of UCI data to be sent to conform to a payload size of physical uplink control channel (PUCCH) resources, wherein the PUCCH resources are selected, based on the first amount of UCI data, from a plurality of PUCCH resources, wherein respective PUCCH resources of the plurality of PUCCH resources include respective numbers of OFDM symbols and a first respective number of OFDM symbols of first respective PUCCH resources associated with a first respective time and frequency is different from a second respective number of OFDM symbols of second respective PUCCH resources associated with a second respective time and frequency, wherein adjusting the amount of UCI data to be sent comprises dropping a first report but not a second report in the UCI based on respective priorities when a total UCI payload size exceeds a maximum allowable payload size supported by a PUCCH format associated with the PUCCH resources; and
transmit the formatted UCI in the PUCCH resources.

20. The UE of claim 19, wherein the processor is further configured to cause the UE to:
decode downlink control information (DCI) having timing information indicating a first resource for sending the HARQ-ACK feedback and a second resource, different from the first resource, for sending at least one of the CSI, BSI or BRI report; and
transmit the HARQ-ACK feedback in the first resource and transmit the at least one of the CSI, BSI or BSI report for transmission in the second resource.

21. The UE of claim 20, wherein:
the timing information further includes a delay value $k_{delay}$ for triggering at least one of a CSI report, a BSI report, or a BRI report; and
the processor is further configured to cause the UE to:
transmit the HARQ-ACK in the first resource, wherein the first resource comprises a first slot having an index $n+k_{min}$; and
transmit the at least one of the CSI report, BSI report, or BRI report in a second slot having an index $n+k_{min}+k_{delay}$, where n is an index of a trigger slot in which the report was triggered, $k_{min}$ is a number of slots corresponding to a minimum HARQ processing delay, and $k_{delay}$ is a number of slots corresponding to an additional reporting delay or offset value indicated in the DCI.

22. The UE of claim 20, wherein:
the timing information further includes a timing offset field, $k_{offset}$, indicating a number of slots by which the at least one of the CSI, BSI or BRI report is delayed a relative to a slot indicated by $n+k_{min}+k_{HARQ\_delay}$, where n is an index of a trigger slot in which the report was triggered, $k_{min}$ is a minimum HARQ processing delay and $k_{HARQ\_delay}$ is a HARQ feedback delay; and
the processor is further configured to cause the UE to:
transmit the HARQ feedback in the first resource, wherein the first resource comprises a first slot having an index $n+k_{min}+k_{HARQ\_delay}$; and
transmit the at least one of the CSI, BSI or BRI report in a second slot having an index $n+k_{min}+k_{HARQ\_delay}+k_{offset}$.

23. The UE of claim 19, wherein the trigger comprises downlink control information (DCI), wherein processor is further configured to cause the UE to adjust the amount of UCI data to be sent by selectively dropping elements of the UCI when the UCI has a size greater than the payload size.

* * * * *

UNITED STATES PATENT AND TRADEMARK OFFICE
CERTIFICATE OF CORRECTION

PATENT NO. : 11,171,746 B2
APPLICATION NO. : 16/309856
DATED : November 9, 2021
INVENTOR(S) : Gang Xiong et al.

It is certified that error appears in the above-identified patent and that said Letters Patent is hereby corrected as shown below:

In the Claims

Claim 4, Column 27, Line 55, Please delete "HARQ ACK" and substitute "HARQ-ACK".

Claim 16, Column 28, Line 62, Please delete "HARQACK" and substitute "HARQ-ACK".

Claim 16, Column 29, Line 11, Please delete "UCI PUCCH" and substitute "UCI on the PUCCH".

Signed and Sealed this
Fourteenth Day of March, 2023

Katherine Kelly Vidal
*Director of the United States Patent and Trademark Office*